(12) United States Patent
Kitada et al.

(10) Patent No.: US 12,586,821 B2
(45) Date of Patent: Mar. 24, 2026

(54) LEAD-ACID BATTERY

(71) Applicant: GS Yuasa International Ltd., Kyoto (JP)

(72) Inventors: Yuri Kitada, Kyoto (JP); Kazuki Sekiya, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 511 days.

(21) Appl. No.: 18/038,743

(22) PCT Filed: Oct. 28, 2021

(86) PCT No.: PCT/JP2021/039832
§ 371 (c)(1),
(2) Date: May 25, 2023

(87) PCT Pub. No.: WO2022/113635
PCT Pub. Date: Jun. 2, 2022

(65) Prior Publication Data
US 2024/0030499 A1 Jan. 25, 2024

(30) Foreign Application Priority Data

Nov. 27, 2020 (JP) ................................. 2020-197594

(51) Int. Cl.
H01M 10/12 (2006.01)
H01M 4/02 (2006.01)
(Continued)

(52) U.S. Cl.
CPC ......... H01M 10/121 (2013.01); H01M 4/583 (2013.01); H01M 4/604 (2013.01);
(Continued)

(58) Field of Classification Search
CPC .... H01M 10/121; H01M 4/627; H01M 4/606; H01M 4/604; H01M 4/583
See application file for complete search history.

(56) References Cited

U.S. PATENT DOCUMENTS

| | | |
|---|---|---|
| 2017/0033362 A1 | 2/2017 | Hara et al. |
| 2018/0076460 A1 | 3/2018 | Hara et al. |
| 2022/0200007 A1 | 6/2022 | Kagohashi et al. |

FOREIGN PATENT DOCUMENTS

| | | |
|---|---|---|
| CN | 101937996 A | 1/2011 |
| EP | 3188289 A1 | 7/2017 |

(Continued)

OTHER PUBLICATIONS

International Search Report (ISR) dated Dec. 14, 2021 filed in PCT/JP2021/039832.

*Primary Examiner* — Sarah A. Slifka
(74) *Attorney, Agent, or Firm* — RANKIN, HILL & CLARK LLP

(57) ABSTRACT

A valve regulated lead-acid battery includes at least one cell including an element and an electrolyte solution. The element includes a negative electrode plate, a positive electrode plate, and a separator interposed between the negative electrode plate and the positive electrode plate. The negative electrode plate includes a negative electrode material. The negative electrode material contains a polymer compound having a peak in a range of 3.2 ppm or more and 3.8 ppm or less in a chemical shift of a $^{1}$H-NMR spectrum measured using deuterated chloroform as a solvent, or contains a polymer compound having a repeating structure of oxy $C_{2-4}$ alkylene units. The positive electrode plate includes a positive electrode material. A density of the positive electrode material is 3.70 g/cm$^3$ or more and 4.65 g/cm$^3$ or less.

15 Claims, 1 Drawing Sheet

(51) Int. Cl.
*H01M 4/583* (2010.01)
*H01M 4/60* (2006.01)
*H01M 4/62* (2006.01)

(52) U.S. Cl.
CPC ........... *H01M 4/606* (2013.01); *H01M 4/627* (2013.01); *H01M 2004/027* (2013.01); *H01M 2220/20* (2013.01)

(56) References Cited

FOREIGN PATENT DOCUMENTS

| | | | |
|---|---|---|---|
| EP | 3855537 | A1 | 7/2021 |
| JP | 51-47237 | A | 4/1976 |
| JP | 60-182662 | A | 9/1985 |
| JP | 9-147869 | A | 6/1997 |
| JP | 2000-149981 | A | 5/2000 |
| JP | 2002-093409 | A | 3/2002 |
| JP | 2002-231251 | A | 8/2002 |
| JP | 2007-250361 | A | 9/2007 |
| JP | 2008-186654 | A | 8/2008 |
| JP | 2011-258531 | A | 12/2011 |
| JP | 2014-175066 | A | 9/2014 |
| JP | 2014-179229 | A | 9/2014 |
| WO | 2015/156293 | A1 | 10/2015 |
| WO | 2016/031772 | A1 | 3/2016 |
| WO | 2020/080419 | A1 | 4/2020 |
| WO | 2020/241878 | A1 | 12/2020 |

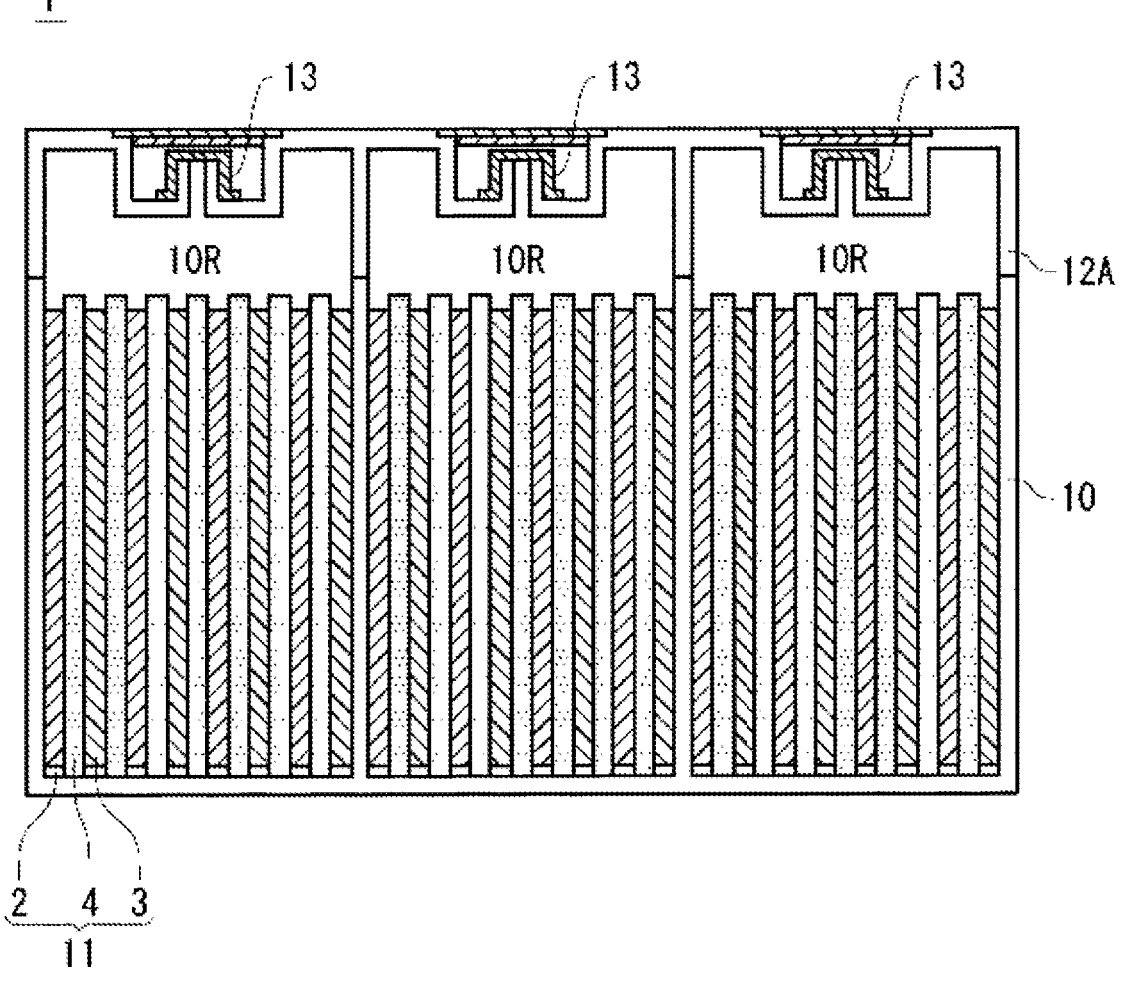

LEAD-ACID BATTERY

TECHNICAL FIELD

The present invention relates to a lead-acid battery.

BACKGROUND ART

Lead-acid batteries are in use for various applications, including automotive and industrial applications. The lead-acid batteries include a negative electrode plate, a positive electrode plate, a separator (or mat), an electrolyte solution, and the like. Each plate includes a current collector and an electrode material.

The lead-acid battery includes a flooded-type lead-acid battery and a valve regulated lead-acid battery. The flooded-type lead-acid battery is an open type lead-acid battery including a container, and an element and an electrolyte solution housed in the container. On the other hand, the valve regulated lead-acid battery is a sealed lead-acid battery including an element including a positive electrode plate, a negative electrode plate, and a fine glass mat separator (retainer mat) interposed between the positive electrode plate and the negative electrode plate, and an electrolyte solution. The valve regulated lead-acid battery utilizes a principle referred to a so-called oxygen cycle in which the electrolyte solution is held by the separator and oxygen gas generated in the positive electrode plate is reduced to water in the negative electrode plate.

An additive may be added to constituent members of the lead-acid battery from the viewpoint of imparting various functions to the lead-acid battery.

Patent Document 1 proposes a lead-acid battery containing, in an electrolyte solution and/or an electrode active material molded body, a polymer compound containing any one of the group consisting of polyvinyl alcohol, polyethylene glycol, polyvinylpyrrolidone, polyacrylic acid, or esters thereof having a degree of polymerization of 30 or more and 3000 or less, or either the polymer compound or colloidal barium sulfate particles.

It has also been proposed to adjust the density and the like of the electrode material.

Patent Document 2 proposes a lead-acid battery in which a positive electrode plate holding a positive active material containing barium is formed, barium is contained in the formed positive electrode plate in an average value of 10 ppm or more and 1000 ppm or less per plate, an active material density of the formed plate is 3.1 g/cc or more and 4.2 g/cc or less in an average value per plate, and when a content of the barium is X and the active material density is Y, $-0.29 \log X + 3.6 \leq Y \leq -0.29 \log X + 4.7$ is satisfied.

PRIOR ART DOCUMENTS

Patent Documents

Patent Document 1: JP-A-2000-149981
Patent Document 2: JP-A-2011-258531

SUMMARY OF THE INVENTION

Problems to be Solved by the Invention

In a lead-acid battery, lead sulfate is generated when self discharge occurs. The lead sulfate generated by self discharge is hardly reduced during charge. When accumulation of lead sulfate becomes remarkable, sulfation in which the accumulated lead sulfate is inactivated occurs, and life performance is deteriorated. Thus, in the lead-acid battery, it is required to suppress self discharge. In addition, in the valve regulated lead-acid battery, since the amount of the electrolyte solution to that of the active material is smaller, a specific gravity of the electrolyte solution decreases as the self discharge progresses, and the voltage tends to decrease.

Means for Solving the Problems

In view of the above, a first aspect of the present invention relates to a valve regulated lead-acid battery including at least one cell including an element and an electrolyte solution, wherein the element includes a negative electrode plate, a positive electrode plate, and a separator interposed between the negative electrode plate and the positive electrode plate, the negative electrode plate includes a negative electrode material, the negative electrode material contains a polymer compound having a peak in a range of 3.2 ppm or more and 3.8 ppm or less in a chemical shift of a $^1$H-NMR spectrum measured using deuterated chloroform as a solvent, the positive electrode plate includes a positive electrode material, and a density of the positive electrode material is 3.70 g/cm$^3$ or more and 4.65 g/cm$^3$ or less.

A second aspect of the present invention relates to a valve regulated lead-acid battery including at least one cell including an element and an electrolyte solution, wherein the element includes a negative electrode plate, a positive electrode plate, and a separator interposed between the negative electrode plate and the positive electrode plate, the negative electrode plate includes a negative electrode material, the negative electrode material contains a polymer compound having a repeating structure of oxy C$_{2-4}$ alkylene units, the positive electrode plate includes a positive electrode material, and a density of the positive electrode material is 3.70 g/cm$^3$ or more and 4.65 g/cm$^3$ or less.

BRIEF DESCRIPTION OF THE DRAWINGS

FIG. 1 is a cross-sectional view schematically illustrating a structure of a valve regulated lead-acid battery according to an embodiment.

MODE FOR CARRYING OUT THE INVENTION

In a lead-acid battery, since a progress of a self discharge reaction is relatively slow, lead sulfate generated at the time of self discharge in a negative electrode plate tends to cause the crystal structure to grow and become dense. Such lead sulfate has low activity and is hardly reduced during charge. Thus, even if the lead-acid battery is charged after self discharge, lead sulfate is likely to be accumulated as it is. When the lead-acid battery is repeatedly charged and discharged in such a state, accumulation of lead sulfate progresses, sulfation occurs, and the life performance of the lead-acid battery is deteriorated. For example, in a small mobility such as a motorcycle, a period of non-use may continue depending on the season, and therefore, self discharge of the mounted lead-acid battery is likely to progress.

In view of the above, the lead-acid battery according to the first aspect of the present invention is a valve regulated lead-acid battery, and the valve regulated lead-acid battery includes at least one cell including an element and an electrolyte solution. The element includes a negative electrode plate, a positive electrode plate, and a separator interposed between the negative electrode plate and the positive electrode plate. The negative electrode plate includes a negative electrode material. The negative electrode material contains a polymer compound having a peak in a range of 3.2 ppm or more and 3.8 ppm or less in a chemical shift of a $^1$H-NMR spectrum measured using deuterated chloroform as a solvent. The positive electrode plate includes a positive electrode material. A density of the positive electrode material is 3.70 g/cm$^3$ or more and 4.65 g/cm$^3$ or less.

Note that the peak appearing in a chemical shift in a range of 3.2 ppm or more and 3.8 ppm or less in the $^1$H-NMR spectrum is derived from an oxy $C_{2-4}$ alkylene unit.

The lead-acid battery according to the second aspect of the present invention is a valve regulated lead-acid battery, and the lead-acid battery includes at least one cell including an element and an electrolyte solution. The element includes a negative electrode plate, a positive electrode plate, and a separator interposed between the negative electrode plate and the positive electrode plate. The negative electrode plate includes a negative electrode material. The negative electrode material contains a polymer compound having a repeating structure of oxy $C_{2-4}$ alkylene units. The positive electrode plate includes a positive electrode material. A density of the positive electrode material is 3.70 g/cm$^3$ or more and 4.65 g/cm$^3$ or less.

In the lead-acid battery according to each of the first aspect and the second aspect of the present invention, the negative electrode material contains a polymer compound as described above, and the density of the positive electrode material is controlled within the above specific range. With such a configuration, self discharge of the lead-acid battery can be remarkably reduced. By reducing the self discharge, it is advantageous for prolonging the life of the lead-acid battery.

In the lead-acid battery according to each of the first aspect and the second aspect of the present invention, self discharge is reduced for the following reasons.

First, by increasing the density of the positive electrode material to 3.70 g/cm$^3$ or more, the size of a pore in the positive electrode material is reduced, and the electrolyte solution is less likely to enter the inside of the positive electrode material. As a result, the discharge reaction itself is reduced, so that the self discharge reaction is also reduced. In a general valve regulated lead-acid battery, the density of the positive electrode material is about 3.66 g/cm$^3$.

Next, in the lead-acid batteries according to the first aspect and the second aspect of the present invention, the density of the positive electrode material is high, and the self discharge reaction is reduced. As a result, the amount of oxygen gas generated from the positive electrode plate is reduced. In the negative electrode plate, when oxygen gas is absorbed to generate water, a side reaction in which PbO is generated from Pb occurs. PbO reacts with the electrolyte solution to produce lead sulfate. However, the amount of oxygen gas generated from the positive electrode plate is reduced, so that the amount of PbO generated is also reduced, and therefore, the reaction of producing lead sulfate is also reduced. As a result, self discharge is reduced.

In addition, the polymer compound contained in the negative electrode material has a repeating structure of oxy $C_{2-4}$ alkylene units, so that it is easy to take a linear structure, and therefore, in the negative electrode material, the lead surface is thinly and widely covered with the polymer compound. As a result, an absorption reaction itself of the oxygen gas in the negative electrode plate is reduced, so that self discharge is reduced.

As described above, the self discharge is remarkably reduced by the plurality of factors being related to each other. Thus, the self discharge can be synergistically reduced.

The above-described effect of the polymer compound in the negative electrode material is exhibited by covering the lead surface with the polymer compound. Thus, it is important that the polymer compound is present near lead, whereby the effect of the polymer compound can be effectively exhibited. Thus, it is important that the negative electrode material contains the polymer compound regardless of whether or not a component of the lead-acid battery other than the negative electrode material contains the polymer compound.

In the lead-acid battery according to the first aspect of the present invention, the polymer compound may contain an oxygen atom bonded to a terminal group and a —CH$_2$— group and/or a —CH< group bonded to the oxygen atom. In the $^1$H-NMR spectrum, a ratio of an integrated value of the peak of 3.2 ppm to 3.8 ppm to the sum of the integrated value of the peak of 3.2 ppm to 3.8 ppm, an integrated value of a peak of hydrogen atoms of the —CH$_2$— group bonded to the oxygen atom, and an integrated value of a peak of a hydrogen atom of the —CH< group bonded to the oxygen atom is preferably 85% or more. Such polymer compounds contain many oxy $C_{2-4}$ alkylene units in the molecule. Therefore, it is considered that the polymer compound easily adsorbs to lead and is likely to take a linear structure, so that it becomes easy to thinly cover the lead surface. Therefore, the absorption reaction of the oxygen gas in the negative electrode plate is further reduced, and the self discharge can be more effectively reduced.

In the $^1$H-NMR spectrum, the polymer compound having a peak in the chemical shift range of 3.2 ppm to 3.8 ppm preferably has a repeating structure of oxy $C_{2-4}$ alkylene units. When the polymer compound having a repeating structure of oxy $C_{2-4}$ alkylene units is used, it is considered that the polymer compound becomes easier to adsorb to lead, and it becomes easy to thinly cover the lead surface by easily taking a linear structure. Therefore, the absorption reaction of the oxygen gas in the negative electrode plate is further reduced, and the self discharge can be more effectively reduced.

The polymer compound may contain at least one selected from a group consisting of a hydroxy compound having a repeating structure of oxy $C_{2-4}$ alkylene units, an etherified product of the hydroxy compound, and an esterified product of the hydroxy compound. Here, the hydroxy compound is at least one selected from a group consisting of poly $C_{2-4}$ alkylene glycols, copolymers having a repeating structure of oxy $C_{2-4}$ alkylene, and poly $C_{2-4}$ alkylene oxide adducts of a polyol. When such a polymer compound is used, it is considered that the polymer compound becomes easier to adsorb to lead, and it becomes easy to thinly cover the lead surface by easily taking a linear structure. Therefore, the absorption reaction of the oxygen gas in the negative electrode plate is further reduced, and the self discharge can be more effectively reduced.

The polymer compound may have a repeating structure of oxypropylene units (—O—CH(—CH$_3$)—CH$_2$—). The case of containing such a polymer compound in the negative electrode material, self discharge tends to increase when the density of the positive electrode material is 3.70 g/cm$^3$ or more as compared with the case of containing a repeating structure of oxyethylene units (—O—CH$_2$—CH$_2$—). In each of the first aspect and the second aspect, even when the negative electrode material contains a polymer compound having a repeating structure of oxypropylene units, self discharge can be suppressed to a low level by controlling the density of the positive electrode material.

The polymer compound may have one or more hydrophobic groups, and at least one of the hydrophobic groups may be a long-chain aliphatic hydrocarbon group having 8 or more carbon atoms. The action of such a hydrophobic group suppresses excessive covering of the lead surface with the polymer compound, and uneven distribution of the polymer compound is suppressed. It is preferable that the polymer compound has a repeating structure of oxyethylene units. When the polymer compound has a repeating structure of oxyethylene units having high hydrophilicity, the polymer compound can be selectively adsorbed to lead. By the balance between the hydrophobic group and the hydrophilic group, the uneven distribution of the polymer compound is suppressed while high adsorptivity to lead is secured, so that self discharge can be further reduced, and high low-temperature high-rate (HR) discharge performance can be secured.

As described above, since the polymer compound can thinly cover the lead surface while having high adsorptivity to lead, even if the content of the polymer compound in the negative electrode material is small, self discharge can be reduced. From the viewpoint of further reducing the self discharge, the content of the polymer compound in the negative electrode material is preferably 10 ppm or more on a mass basis. From the viewpoint of securing a higher low-temperature HR discharge performance, the content of the polymer compound in the negative electrode material is preferably 370 ppm or less on a mass basis.

In the lead-acid battery, it is sufficient that the polymer compound can be contained in the negative electrode material, and the source of the polymer compound contained in the negative electrode material is not particularly limited. The polymer compound may be contained in any of the components (for example, a negative electrode plate, a positive electrode plate, an electrolyte solution and a separator) of the lead-acid battery when preparing the lead-acid battery. The polymer compound may be contained in one component, or may be contained in two or more components (for example, a negative electrode plate and an electrolyte solution).

The negative electrode material may contain a condensate of a bisarene compound. The condensate of the bisarene compound is generally classified as a synthetic organic expander. In general, when the negative electrode material contains the condensate of the bisarene compound, the specific surface area of the negative electrode material increases, and therefore, a hydrogen overvoltage tends to decrease. However, in the lead-acid battery according to the first aspect and the second aspect of the present invention, since the negative electrode material contains a polymer compound and the density of the positive electrode material is controlled within a specific range, even when the organic expander contains the condensate of the bisarene compound, hydrogen overvoltage can be increased to suppress self discharge to a low level. Even when the negative electrode material contains a lignin compound, the self discharge can be suppressed to a low level.

The negative electrode material may contain a carbonaceous material. The content of the carbonaceous material in the negative electrode material is preferably 0.1% by mass or more. In this case, self discharge tends to increase as the hydrogen overvoltage decreases. However, even in such a case, the self discharge can be suppressed to a low level by controlling the density of the positive electrode material while the negative electrode material containing the polymer compound. The content of the carbonaceous material in the negative electrode material is preferably 1.2% by mass or less from the viewpoint of further enhancing the effect of reducing the self discharge as the polymer compound is easily adsorbed to lead.

In small mobility applications, as described above, self discharge is likely to progress in a non-use period. Thus, the lead-acid battery according to each of the first aspect and the second aspect is suitable for small mobility applications. However, the application of the lead-acid battery is not limited to small mobility applications.

The valve regulated lead-acid battery is sometimes referred to as a sealed lead-acid battery (or VRLA type lead-acid battery).

In the present specification, the content of the polymer compound in the negative electrode material and the density of the positive electrode material are determined for the negative electrode plate or the positive electrode plate taken out from the lead-acid battery in a full charge state.

Description of Terminology (Electrode Material)

The negative electrode material and a positive electrode material are each usually held by the current collector. The electrode material is a portion of the plate which excludes the current collector. A member such as a mat or a pasting paper may be stuck to the plate. Such a member (also referred to as a sticking member) is used integrally with the plate and is thus included in the plate. When the plate includes the sticking member (such as a mat or a pasting paper), the electrode material is a portion of the plate which excludes the current collector and the sticking member from the plate.

Among positive electrode plates, a clad-type positive electrode plate includes a plurality of porous tubes, a spine inserted into each tube, a current collector connecting a plurality of spines, a positive electrode material with which a spine inserted tube is filled, and a spine protector connecting a plurality of tubes. In the clad-type positive electrode plate, the positive electrode material is a portion of the plate which excludes the tubes, the spines, the current collecting portion and the spine protector. In the clad-type positive electrode plate, the spine and the current collector may be collectively referred to as a positive current collector.

(Density of Positive Electrode Material)

The density of the positive electrode material is a density (g/cm$^3$) determined by dividing the mass of the positive electrode material by a bulk volume determined by a mercury intrusion method. The density is determined for a sample of an unground positive electrode material taken out from a positive electrode plate taken from the lead-acid battery. The unground sample is taken from the vicinity of the center of the positive electrode plate in a planar direction.

(Polymer Compound)

The polymer compound satisfies at least one of the following conditions (i) and (ii).

7

8

Condition (i)

The polymer compound has a peak in a range of 3.2 ppm or more and 3.8 ppm or less in a chemical shift of a $^1$H-NMR spectrum measured using deuterated chloroform as a solvent.

Condition (ii)

The polymer compound has a repeating structure of oxy $C_{2-4}$ alkylene units.

In the condition (i), the peak appearing in the range of 3.2 ppm or more and 3.8 ppm or less is derived from the oxy $C_{2-4}$ alkylene unit. That is, the polymer compound satisfying the condition (ii) is also the polymer compound satisfying the condition (i). The polymer compound satisfying the condition (i) may have a repeating structure of monomer units other than the oxy $C_{2-4}$ alkylene unit, and may have a certain level of molecular weight. The number average molecular weight (Mn) of the polymer compound satisfying the above condition (i) or (ii) may be, for example, 300 or more.

(Oxy $C_{2-4}$ Alkylene Unit)

Note that the oxy $C_{2-4}$ alkylene unit is a unit represented by —O—$R^1$— ($R^1$ represents a $C_{2-4}$ alkylene group).

(Condensate of Bisarene Compound)

The condensate of the bisarene compound is a condensate containing a unit of the bisarene compound. The unit of the bisarene compound refers to a unit derived from the bisarene compound incorporated in a condensate. The bisarene compound is a compound in which two sites each having an aromatic ring are linked via a single bond or a linking group.

(Number Average Molecular Weight)

In the present description, the number average molecular weight (Mn) is determined by gel permeation chromatography (GPC). A standard substance used for determining Mn is polyethylene glycol.

(Weight Average Molecular Weight)

In the present specification, the weight average molecular weight (Mw) is determined by GPC. A standard substance used for determining the Mw is sodium polystyrene sulfonate.

(Fully Charge State)

The full charge state of a valve regulated lead-acid battery is a state where the lead-acid battery is subjected to constant current constant voltage charge of 2.23 V/cell at the current (A) 0.2 times as large as the numerical value (numerical value whose unit is Ah) described as the rated capacity in an air tank of 25° C.±2° C., and the charge is completed when the charge current during constant voltage charge becomes a value (A) of 0.005 times as large as the numerical value (numerical value whose unit is Ah) described in the rated capacity.

The lead-acid battery in the full charge state refers to a lead-acid battery obtained by fully charging a formed lead-acid battery. The full charge of the lead-acid battery may be performed immediately after formation so long as being performed after formation or may be performed after the lapse of time from formation (e.g., a lead-acid battery in use (preferably at the initial stage of use) after formation may be fully charged). The battery at the initial stage of use refers to a battery that has not been used for a long time and has hardly deteriorated.

(Up-Down Direction of Lead-Acid Battery or Components of Lead-Acid Battery)

In the present specification, the up-down direction of the lead-acid battery or components (such as plate, container, and separator) of the lead-acid battery means the up-down direction of the lead-acid battery in the vertical direction when the lead-acid battery is in use. Each of the positive electrode plate and the negative electrode plate includes a lug for connecting to an external terminal. In a horizontal valve regulated lead-acid battery or the like, the lug may be provided at a side portion of the plate so as to protrude laterally; however, in many lead-acid batteries, the lug is usually provided at an upper portion of the plate so as to protrude upward.

(Small Mobility)

Small mobility refers to motorcycles and power sports vehicles. The small mobility includes, for example, motorcycles, motor tricycles, buggies (including both three-wheeled buggies and four-wheeled buggies), water skis, snowmobiles, and all-terrain vehicles. In the small mobility, a lead-acid battery for small mobility is mounted together with an engine. The lead-acid battery (that is, a lead-acid battery for small mobility) used or mounted for the small mobility refers to a lead-acid battery included in the application range of IEC 60095-7: 2019 and the application range of JIS D 5302: 2004.

Hereinafter, the lead-acid battery according to an embodiment of the present invention will be described for each of the main constituent elements, but the present invention is not limited to the following embodiment.

[Lead-Acid Battery]

(Negative Electrode Plate)

The negative electrode plate usually includes a negative current collector in addition to a negative electrode material.

(Negative Current Collector)

The negative current collector may be prepared by casting lead (Pb) or a lead alloy, or may be prepared by processing a lead sheet or a lead alloy sheet. Examples of the processing method include expanding processing or punching processing. It is preferable to use the grid-like current collector as the negative current collector because the negative electrode material is easy to support.

The lead alloy used for the negative current collector may be any of a Pb—Sb-based alloy, a Pb—Ca-based alloy, and a Pb—Ca—Sn-based alloy. The lead or lead alloys may further contain, as an additive element, at least one selected from the group consisting of Ba, Ag, Al, Bi, As, Se, Cu, and the like. The negative current collector may include a surface layer. The surface layer and the inner layer of the negative current collector may have different compositions. The surface layer may be prepared in a part of the negative current collector. The surface layer may be prepared in the lug part of the negative current collector. The surface layer of the lug part may contain Sn or a Sn alloy.

(Negative Electrode Material)

The negative electrode material contains the above polymer compound. The negative electrode material further contains a negative active material (specifically, lead or lead sulfate) that exhibits a capacity through a redox reaction. The negative electrode material may contain at least one selected from a group consisting of an organic expander, a carbonaceous material, and other additives. Examples of the additive include barium sulfate, fibers (resin fibers and the like), and the like, but are not limited thereto. Note that the negative active material in the charged state is spongy lead, but the non-formed negative electrode plate is usually prepared using lead powder.

(Polymer Compound)

The polymer compound has a peak in a range of 3.2 ppm or more and 3.8 ppm or less in a chemical shift of a $^1$H-NMR spectrum. Such polymer compounds have oxy $C_{2-4}$ alkylene units. Examples of the oxy $C_{2-4}$ alkylene unit include an oxyethylene unit, an oxypropylene unit, an oxytrimethylene unit, an oxy 2-methyl-1,3-propylene unit, an oxy 1,4-butylene unit, an oxy 1,3-butylene unit, and the like. The polymer compound may have one kind or two or more kinds of such oxy $C_{2-4}$ alkylene units.

The polymer compound preferably has a repeating structure of oxy $C_{2-4}$ alkylene units. The repeating structure may contain one type of oxy $C_{2-4}$ alkylene unit, or may contain two or more kinds of oxy $C_{2-4}$ alkylene units. The polymer compound may contain one type of the repeating structure or two or more kinds of repeating structures.

The polymer compound having a repeating structure of oxy $C_{2-4}$ alkylene units also includes polymer compounds classified as a surfactant (more specifically, a nonionic surfactant).

Examples of the polymer compound include hydroxy compounds having a repeating structure of oxy $C_{2-4}$ alkylene units (poly $C_{2-4}$ alkylene glycols, copolymers having a repeating structure of oxy $C_{2-4}$ alkylene, poly $C_{2-4}$ alkylene oxide adducts of a polyol, and the like), etherified or esterified products of these hydroxy compounds, and the like.

Examples of the copolymer include copolymers containing different oxy $C_{2-4}$ alkylene units. The copolymer may be a block copolymer.

The polyol may be any of an aliphatic polyol, an alicyclic polyol, an aromatic polyol, a heterocyclic polyol, and the like. From the viewpoint that the polymer compound easily spreads thinly on the lead surface, aliphatic polyols, alicyclic polyols (for example, polyhydroxycyclohexane and polyhydroxynorbornane), and the like are preferable, and among them, aliphatic polyols are preferable. Examples of the aliphatic polyol include aliphatic diols and polyols with three or more hydroxyl groups (for example, glycerin, trimethylolpropane, pentaerythritol, sugar or sugar alcohol), and the like. Examples of the aliphatic diol include an alkylene glycol having 5 or more carbon atoms. The alkylene glycol may be, for example, a $C_{5-14}$ alkylene glycol or a $C_{5-10}$ alkylene glycol. Examples of the sugar or sugar alcohol include sucrose, erythritol, xylitol, mannitol, sorbitol, and the like. The sugar or sugar alcohol may have either a chain structure or a cyclic structure. In the polyalkylene oxide adduct of the polyol, the alkylene oxide corresponds to an oxy $C_{2-4}$ alkylene unit of the polymer compound and contains at least $C_{2-4}$ alkylene oxide. From the viewpoint that the polymer compound easily take a linear structure, the polyol is preferably a diol.

The etherified product has an $—OR^2$ group obtained by etherifying $—OH$ groups ($—OH$ groups composed of a hydrogen atom of a terminal group and an oxygen atom bonded to the hydrogen atom) at at least a part of terminals of the hydroxy compound having the repeating structure of oxy $C_{2-4}$ alkylene units (wherein $R^2$ is an organic group). Among terminals of the polymer compound, some terminals may be etherified, or all terminals may be etherified. For example, one terminal of a main chain of the linear polymer compound may be an $—OH$ group, and the other terminal may be an $—OR^2$ group.

The esterified product has an $—O—C(=O)—R^3$ group obtained by esterifying $—OH$ groups ($—OH$ groups composed of a hydrogen atom of a terminal group and an oxygen atom bonded to the hydrogen atom) at at least a part of terminals of the hydroxy compound having the repeating structure of oxy $C_{2-4}$ alkylene units (wherein $R^3$ is an organic group). Among terminals of the polymer compound, some terminals may be esterified, or all terminals may be esterified. For example, one terminal of a main chain of the linear polymer compound may be an $—OH$ group, and the other terminal may be an $—O—C(=O)—R^3$ group.

Examples of each of the organic groups $R^2$ and $R^3$ include a hydrocarbon group. The hydrocarbon group includes a hydrocarbon group having a substituent (for example, a hydroxy group, an alkoxy group, and/or a carboxy group). The hydrocarbon group may be any of aliphatic, alicyclic, and aromatic. The aromatic hydrocarbon group and the alicyclic hydrocarbon group may have an aliphatic hydrocarbon group (for example, an alkyl group, an alkenyl group, or an alkynyl group) as a substituent. The number of carbon atoms of the aliphatic hydrocarbon group as a substituent may be, for example, 1 to 30, 1 to 20, 1 to 10, 1 to 6, or 1 to 4.

Examples of the aromatic hydrocarbon group include aromatic hydrocarbon groups having 24 or less carbon atoms (for example, 6 to 24). The number of carbon atoms of the aromatic hydrocarbon group may be 20 or less (for example, 6 to 20), 14 or less (for example, 6 to 14), or 12 or less (for example, 6 to 12). Examples of the aromatic hydrocarbon group include an aryl group, a bisaryl group, and the like. Examples of the aryl group include a phenyl group, and a naphthyl group. Examples of the bisaryl group include monovalent groups corresponding to bisarene. Examples of the bisarene include biphenyl and bisarylalkanes (for example, bis $C_{6-10}$ aryl $C_{1-4}$ alkanes (such as 2,2-bisphenylpropane)).

Examples of the alicyclic hydrocarbon group include alicyclic hydrocarbon groups having 16 or less carbon atoms. The alicyclic hydrocarbon group may be a bridged cyclic hydrocarbon group. The number of carbon atoms of the alicyclic hydrocarbon group may be 10 or less or 8 or less. The number of carbon atoms of the alicyclic hydrocarbon group is, for example, 5 or more, and may be 6 or more.

The number of carbon atoms of the alicyclic hydrocarbon group may be 5 (or 6) or more and 16 or less, 5 (or 6) or more and 10 or less, or 5 (or 6) or more and 8 or less.

Examples of the alicyclic hydrocarbon group include cycloalkyl groups (cyclopentyl group, cyclohexyl group, cyclooctyl group, and the like), cycloalkenyl groups (cyclohexenyl group, cyclooctenyl group, and the like), and the like. The alicyclic hydrocarbon group also includes hydrogenated products of the aromatic hydrocarbon groups.

Among the hydrocarbon groups, an aliphatic hydrocarbon group is preferable from the viewpoint that the polymer compound easily adheres thinly to the lead surface. The aliphatic hydrocarbon group may be saturated or unsaturated. Examples of the aliphatic hydrocarbon group include an alkyl group, an alkenyl group, an alkynyl group, a dienyl group having two carbon-carbon double bonds, and a trienyl group having three carbon-carbon double bonds. The aliphatic hydrocarbon group may be either linear or branched.

The number of carbon atoms of the aliphatic hydrocarbon group is, for example, 30 or less, and may be 26 or less or 22 or less, 20 or less or 16 or less, 14 or less or 10 or less, or 8 or less or 6 or less. The lower limit of the number of carbon atoms is 1 or more for an alkyl group, 2 or more for an alkenyl group and an alkynyl group, 3 or more for a dienyl group, and 4 or more trienyl group, depending on the type of the aliphatic hydrocarbon group. Among them, an alkyl group and an alkenyl group are preferable from the viewpoint that the polymer compound easily adheres thinly to the lead surface.

Specific examples of the alkyl group include methyl, ethyl, n-propyl, i-propyl, n-butyl, i-butyl, s-butyl, t-butyl, n-pentyl, neopentyl, i-pentyl, s-pentyl, 3-pentyl, t-pentyl, n-hexyl, 2-ethylhexyl, n-octyl, n-nonyl, n-decyl, i-decyl, undecyl, lauryl (dodecyl), tridecyl, myristyl, pentadecyl, cetyl, heptadecyl, stearyl, icosyl, henicosyl, and behenyl.

Specific examples of the alkenyl group include vinyl, 1-propenyl, allyl, cis-9-heptadecene-1-yl, palmitoleyl, and oleyl. An alkenyl group may be, for example, a $C_{2-30}$ alkenyl group or a $C_{2-26}$ alkenyl group, a $C_{2-22}$ alkenyl group or a $C_{2-20}$ alkenyl group, or a $C_{10-20}$ alkenyl group.

When at least one selected from a group consisting of an etherified product of a hydroxy compound having a repeating structure of oxy $C_{2-4}$ alkylene units and an esterified product of a hydroxy compound having a repeating structure of oxy $C_{2-4}$ alkylene units are used among the polymer compounds, it is preferable because self discharge can be further reduced. Among the polymer compounds as described above, polymer compounds having a repeating structure of oxypropylene units, polymer compounds having a repeating structure of oxyethylene units, and the like are preferable.

The polymer compound may have one or more hydrophobic groups. Examples of the hydrophobic group include an aromatic hydrocarbon group, an alicyclic hydrocarbon group, and a long-chain aliphatic hydrocarbon group among the above-mentioned hydrocarbon groups. Examples of the long-chain aliphatic hydrocarbon group include aliphatic hydrocarbon groups having 8 or more carbon atoms among the above-mentioned aliphatic hydrocarbon groups (such as alkyl groups and alkenyl groups), aliphatic hydrocarbon groups having 12 or more carbon atoms is preferable, and aliphatic hydrocarbon groups having 16 or more carbon atoms is more preferable. Among them, the polymer compound having a long-chain aliphatic hydrocarbon group is preferable because it hardly causes excessive adsorption to lead and easily secures higher low-temperature HR discharge performance while suppressing self discharge to a low level. The polymer compound may be a polymer compound in which at least one of the hydrophobic groups is a long-chain aliphatic hydrocarbon group. The number of carbon atoms of the long-chain aliphatic hydrocarbon group may be 30 or less, 26 or less, or 22 or less.

The number of carbon atoms of the long-chain aliphatic hydrocarbon group may be 8 or more (or 12 or more) and 30 or less, 8 or more (or 12 or more) and 26 or less, 8 or more (or 12 or more) and 22 or less, 10 or more and 30 or less (or 26 or less), or 10 or more and 22 or less.

Among the polymer compounds, a polymer compound having a hydrophilic group and a hydrophobic group corresponds to a nonionic surfactant. The repeating structure of oxyethylene units exhibits high hydrophilicity and can be a hydrophilic group in the nonionic surfactant. Thus, the polymer compound having a hydrophobic group preferably has a repeating structure of oxyethylene units. The polymer compound as described above can suppress excessive covering of the lead surface while being selectively adsorbed to lead due to a balance between hydrophobicity and high hydrophilicity due to the repeating structure of oxyethylene units, and thus, it is possible to secure higher low-temperature HR discharge performance while suppressing self discharge to a low level. The polymer compound as described above can secure high adsorptivity to lead even with a relatively low molecular weight (for example, Mn is 1000 or less).

Among the polymer compounds, a polyoxypropylene-polyoxyethylene block copolymer, an etherified product of a hydroxy compound having a repeating structure of oxyethylene units, an esterified product of a hydroxy compound having a repeating structure of oxyethylene units, and the like correspond to a nonionic surfactant.

In a polyoxypropylene-polyoxyethylene block copolymer or the like, the repeating structure of oxyethylene units corresponds to a hydrophilic group, and the repeating structure of oxypropylene units corresponds to a hydrophobic group. Such a copolymer is also encompassed by the polymer compound having a hydrophobic group.

The polymer compound having a hydrophobic group preferably has a repeating structure of oxyethylene units. The polymer compound as described above can suppress excessive covering of the lead surface while being selectively adsorbed to lead due to a balance between hydrophobicity and high hydrophilicity due to the repeating structure of oxyethylene units, and thus, it is possible to secure higher low-temperature HR discharge performance while suppressing self discharge to a low level. The polymer compound as described above can secure high adsorptivity to lead even with a relatively low molecular weight (for example, Mn is 1000 or less).

Examples of the polymer compound having a hydrophobic group and having a repeating structure of oxyethylene units include etherified products of polyethylene glycol (such as alkyl ether), esterified products of polyethylene glycol (such as carboxylic acid ester), etherified products of a polyethylene oxide adduct of the polyol (such as alkyl ether), esterified products of a polyethylene oxide adduct (such as carboxylic acid ester) of the polyol (such as polyols with three or more hydroxyl groups), and the like. Specific examples of the polymer compound as described above include polyethylene glycol oleate, polyethylene glycol dioleate, polyethylene glycol dilaurate, polyethylene glycol distearate, polyoxyethylene coconut oil fatty acid sorbitan, polyoxyethylene sorbitan oleate, polyoxyethylene sorbitan stearate, polyoxyethylene lauryl ether, polyoxyethylene tetradecyl ether, and polyoxyethylene cetyl ether. However, the polymer compound is not limited thereto. Among them, use of an esterified product of polyethylene glycol, an esterified product of a polyethylene oxide adduct of the polyol, and the like is preferable because self discharge can be further reduced and higher low-temperature HR discharge performance can be secured.

For the polymer compound classified as a surfactant among the polymer compounds, the HLB of the polymer compound is preferably 4 or more or 4.3 or more from the viewpoint of further easily reducing self discharge. The HLB of the polymer compound is, for example, 18 or less. From the viewpoint of easily securing higher low-temperature HR discharge performance, the HLB of the polymer compound is preferably 10 or less or 9 or less, more preferably 8.5 or less.

The HLB of the polymer compound may be 4 or more (or 4.3 or more) and 18 or less, or 4 or more (or 4.3 or more) and 10 or less. From the viewpoint of achieving an excellent balance between reduction of self discharge and improvement of the low-temperature HR discharge performance, the HLB of the polymer compound is preferably 4 or more (or 4.3 or more) and 9 or less, or 4 or more (or 4.3 or more) and 8.5 or less.

HLB stands for Hydrophile Lipophile Balance, and is a numerical value representing the balance between hydrophobicity and hydrophilicity of a nonionic surfactant.

It is also preferable when the repeating structure of oxy $C_{2-4}$ alkylene contains at least a repeating structure of oxypropylene units. In this case, although self discharge tends to increase than that in the case of the repeating structure of oxyethylene units, even in this case, the self discharge can be suppressed to a low level by controlling the density of the positive electrode material. The polymer compound containing the oxypropylene unit has peaks derived from —CH< and —CH$_2$— of the oxypropylene unit in a range of 3.2 ppm to 3.8 ppm in a chemical shift of a ${}^{1}$H-NMR spectrum. Since electron densities around a nucleus of a hydrogen atom in these groups are different, the peak is split. Such a polymer compound has peaks, for example, in a range of 3.2 ppm or more and 3.42 ppm or less and a range of more than 3.42 ppm and 3.8 ppm or less in a chemical shift of the ${}^{1}$H-NMR spectrum. The peak in the range of 3.2 ppm or more and 3.42 ppm or less is derived from —CH${}_{2}$—, and the peak in the range of more than 3.42 ppm and 3.8 ppm or less is derived from —CH< and —CH${}_{2}$—.

Examples of the polymer compound containing at least a repeating structure of oxypropylene units include polypropylene glycol, a copolymer having a repeating structure of oxypropylene units, a polypropylene oxide adduct of the polyol, etherified or esterified products thereof, and the like. Examples of the copolymer include an oxypropylene-oxyalkylene copolymer (provided that oxyalkylene is C${}_{2-4}$ alkylene other than oxypropylene) and the like. Examples of the oxypropylene-oxyalkylene copolymer include an oxypropylene-oxyethylene copolymer, an oxypropylene-oxytrimethylene copolymer, and the like. The oxypropylene-oxyalkylene copolymer may be referred to as a polyoxypropylene-polyoxyalkylene copolymer (for example, a polyoxypropylene-polyoxyethylene copolymer). The oxypropylene-oxyalkylene copolymer may be a block copolymer (for example, a polyoxypropylene-polyoxyethylene block copolymer). Examples of the etherified product include polypropylene glycol alkyl ether, alkyl ether of an oxypropylene-oxyalkylene copolymer (such as alkyl ether of polyoxypropylene-polyoxyethylene copolymer), and the like. Examples of the esterified product include polypropylene glycol ester of carboxylic acid, carboxylic acid ester of an oxypropylene-oxyalkylene copolymer (such as carboxylic acid ester of polyoxypropylene-polyoxyethylene copolymer), and the like.

Examples of the polymer compound having at least a repeating structure of oxypropylene units include polypropylene glycol, polyoxypropylene-polyoxyethylene copolymers (such as polyoxypropylene-polyoxyethylene block copolymers), polypropylene glycol alkyl ethers (such as alkyl ethers in which R${}^{2}$ is an alkyl having 10 or less (or 8 or less or 6 or less) carbon atoms (such as methyl ether, ethyl ether and butyl ether)), polyoxyethylene-polyoxypropylene alkyl ethers (such as alkyl ethers in which R${}^{2}$ is an alkyl having 10 or less (or 8 or less or 6 or less) carbon atoms (such as butyl ether and hydroxyhexyl ether)), polypropylene glycol carboxylates (such as polypropylene glycol carboxylates in which R${}^{3}$ is an alkyl having 10 or less (or 8 or less or 6 or less) carbon atoms (such as polypropylene glycol acetate), and polypropylene oxide adducts of polyols with three or more hydroxyl groups (such as polypropylene oxide adducts of glycerin), and the like. However, the polymer compound is not limited thereto.

It is preferable that the polymer compound contains a large amount of oxy C${}_{2-4}$ alkylene units from the viewpoint of enhancing adsorptivity of the polymer compound to lead and making it easy for the polymer compound to take a linear structure. Such a polymer compound includes, for example, an oxygen atom bonded to a terminal group and a —CH${}_{2}$— group and/or a —CH< group bonded to the oxygen atom. In the ${}^{1}$H-NMR spectrum of the polymer compound, the ratio of the integrated value of the peak of 3.2 ppm to 3.8 ppm to the sum of the integrated value of the peak of 3.2 ppm to 3.8 ppm, the integrated value of the peak of the hydrogen atoms of the —CH${}_{2}$— group, and the integrated value of the peak of the hydrogen atom of the —CH< group increases. This ratio is, for example, 50% or more, and may be 80% or more. From the viewpoint of further reducing self discharge, the above ratio is preferably 85% or more, more preferably 90% or more. For example, when the polymer compound has an —OH group at a terminal and also has a —CH${}_{2}$— group and/or a —CH< group bonded to an oxygen atom of the —OH group, in the ${}^{1}$H-NMR spectrum, the respective peaks of the hydrogen atoms of the —CH${}_{2}$— group and the —CH< group have a chemical shift in a range of more than 3.8 ppm and 4.0 ppm or less.

The negative electrode material may contain one kind or two or more kinds of polymer compounds.

The polymer compound may include, for example, a compound having Mn of 5,000,000 or less, 1,000,000 or less or 100,000 or less, or 20,000 or less. From the viewpoint of securing higher charge acceptability, the polymer compound preferably contains a compound having Mn of 10,000 or less, may contain 5,000 or less, 3,000 or less, 2,500 or less or 2,000 or less. The Mn of such a compound may be 300 or more, 400 or more, or 500 or more. As the polymer compound, two or more compounds having different Mn may be used. That is, the polymer compound may have a plurality of peaks of Mn in the distribution of the molecular weight.

The Mn of the compound may be 300 or more and 5,000,000 or less (or 1,000,000 or less), 400 or more and 5,000,000 or less (or 1,000,000 or less), 500 or more and 5,000,000 or less (or 1,000,000 or less), 300 or more and 100,000 or less (or 20,000 or less), 400 or more and 100,000 or less (or 20,000 or less), 500 or more and 100,000 or less (or 20,000 or less), 300 or more and 10,000 or less (or 5,000 or less), 400 or more and 10,000 or less (or 5,000 or less), 500 or more and 10,000 or less (or 5,000 or less), 300 or more and 3,000 or less (or 2,500 or less), 400 or more and 3,000 or less (or 2,500 or less), 500 or more and 3,000 or less (or 2,500 or less), 300 or more (or 400 or more) and 2,000 or less, or 500 or more and 2,000 or less.

The content of the polymer compound in the negative electrode material is, for example, 8 ppm or more on a mass basis. From the viewpoint of further reducing self discharge, the content of the polymer compound in the negative electrode material is preferably 10 ppm or more, preferably 20 ppm or more, more preferably 30 ppm or more on a mass basis. The content of the polymer compound in the negative electrode material is, for example, 1,000 ppm or less, may be 500 ppm or less, 450 ppm or less, or 420 ppm or less on a mass basis. From the viewpoint of easily securing higher low-temperature HR discharge performance, the content of the polymer compound in the negative electrode material is preferably 370 ppm or less and may be 350 ppm or less on a mass basis.

The content (mass basis) of the polymer compound in the negative electrode material may be 8 ppm or more (or 10 ppm or more) and 1,000 ppm or less, 8 ppm or more (or 10 ppm or more) and 500 ppm or less, 8 ppm or more (or 10 ppm or more) and 450 ppm or less, 8 ppm or more (or 10 ppm or more) and 420 ppm or less, 8 ppm or more (or 10 ppm or more) and 370 ppm or less, 8 ppm or more (or 10 ppm or more) and 350 ppm or less, 20 ppm or more (or 30 ppm or more) and 1,000 ppm or less, 20 ppm or more (or 30 ppm or more) and 500 ppm or less, 20 ppm or more (or 30 ppm or more) and 450 ppm or less, 20 ppm or more (or 30 ppm or more) and 420 ppm or less, 20 ppm or more (or 30 ppm or more) and 370 ppm or less, or 20 ppm or more (or 30 ppm or more) and 350 ppm or less.

15

(Organic Expander)

The organic expander is an organic compound among compounds having a function of suppressing shrinkage of lead as a negative active material when charge-discharge of the lead-acid battery is repeated. The organic expanders are generally roughly classified into lignin compounds and synthetic organic expanders. It can also be said that the synthetic organic expander is an organic expander other than lignin compounds. Examples of the organic expander contained in the negative electrode material include a lignin compound, a synthetic organic expander, and the like. The negative electrode material may contain one kind or two or more kinds of organic expanders.

Examples of the lignin compounds include lignin, lignin derivatives, and the like. Examples of the lignin derivative include lignin sulfonic acid or salts thereof (such as alkali metal salts (sodium salts and the like)), and the like.

The synthetic organic expander is an organic polymer containing sulfur element, and generally contains a plurality of aromatic rings in the molecule and sulfur element as a sulfur-containing group. Among the sulfur-containing groups, a sulfonic acid group or a sulfonyl group which is in a stable form is preferable. The sulfonic acid group may exist in an acid form, or may exist in a salt form like a Na salt.

From the viewpoint of further reducing self discharge, at least a lignin compound may be used as the organic expander.

As the organic expander, the case of using a condensate containing at least a unit of an aromatic compound is also preferable. Examples of such a condensate include a condensate of an aromatic compound with an aldehyde compound (such as at least one selected from a group consisting of aldehydes (for example, formaldehyde) and condensates thereof). The organic expander may contain a unit of one kind of an aromatic compound or a unit of two or more kinds of aromatic compounds.

Note that the unit of an aromatic compound refers to a unit derived from an aromatic compound incorporated in a condensate.

Examples of the aromatic ring of the aromatic compound include a benzene ring, a naphthalene ring, and the like. When the aromatic compound has a plurality of aromatic rings, the plurality of aromatic rings may be linked by a direct bond or a linking group (for example, an alkylene group (including an alkylidene group), a sulfone group), or the like. Examples of such a structure include bisarene structures (biphenyl, bisphenylalkane, bisphenylsulfone, and the like). Examples of the aromatic compound include compounds having the aromatic ring, and at least one selected from a group consisting of a hydroxy group and an amino group. The hydroxy group or the amino group may be directly bonded to the aromatic ring, or may be bonded as an alkyl chain having a hydroxy group or an amino group. Note that the hydroxy group also includes salts of hydroxy group (—OMe). The amino group also includes salts of an amino group (specifically, salts with anions). Examples of Me include alkali metals (Li, K, Na, and the like), Group 2 metals of the periodic table (Ca, Mg, and the like), and the like.

As the aromatic compound, bisarene compounds [bisphenol compounds, hydroxybiphenyl compounds, bisarene compounds having an amino group (bisarylalkane compounds having an amino group, bisarylsulfone compounds having an amino group, biphenyl compounds having an amino group, and the like), hydroxyarene compounds (hydroxynaphthalene compounds, phenol compounds, and the like), aminoarene compounds (aminonaphthalene compounds, aniline compounds (aminobenzenesulfonic acid, alkylaminobenzenesulfonic acid, and the like), and the like), and the like] are preferable. The aromatic compound may further have a substituent. The organic expander may contain one or more or a plurality of residues of these compounds. As the bisphenol compound, bisphenol A, bisphenol S, bisphenol F, and the like are preferable. When the negative electrode material contains a condensate of a bisarene compound (such as a condensate with an aldehyde compound), self discharge tends to increase; however, when the negative electrode material contains a polymer compound and the density of the positive electrode material is controlled within a specific range, the self discharge can be suppressed to a low level.

The condensate preferably contains a unit of an aromatic compound having at least a sulfur-containing group. In particular, use of a condensate containing at least a unit of a bisphenol compound having a sulfur-containing group is advantage in securing excellent life performance because high high-temperature durability is obtained. From the viewpoint of further reducing self discharge by further increasing the hydrogen overvoltage, it is also preferable to use a condensate from an aldehyde compound of a naphthalene compound having at least one selected from a group consisting of a hydroxy group and an amino group with a sulfur-containing group.

The sulfur-containing group may be directly bonded to the aromatic ring contained in the compound, and for example, may be bonded to the aromatic ring as an alkyl chain having a sulfur-containing group. The sulfur-containing group is not particularly limited, and examples thereof include a sulfonyl group and a sulfonic acid group or a salt thereof.

In addition, as the organic expander, for example, at least a condensate containing at least one selected from a group consisting of units of the bisarene compound and units of a monocyclic aromatic compound (hydroxyarene compound and/or aminoarene compound, or the like) may be used. The organic expander may contain at least a condensate containing a unit of a bisarene compound and a unit of a monocyclic aromatic compound (among them, hydroxyarene compound). Examples of such a condensate include a condensate of a bisarene compound and a monocyclic aromatic compound with an aldehyde compound. As the hydroxyarene compound, a phenol sulfonic acid compound (phenol sulfonic acid, a substituted product thereof, or the like) is preferable. As the aminoarene compound, aminobenzenesulfonic acid, alkylaminobenzenesulfonic acid, and the like are preferable. As the monocyclic aromatic compound, a hydroxyarene compound is preferable.

The negative electrode material may contain, for example, the organic expander (first organic expander) having a sulfur element content of 2,000 μmol/g or more among the organic expanders. Examples of the first organic expander include the synthetic organic expander describe above (such as the condensate).

The sulfur element content in the organic expander being X μmol/g means that the content of the sulfur element contained per 1 g of the organic expander is X μmol.

The sulfur element content of the first organic expander may be 2,000 μmol/g or more, and is preferably 3,000 μmol/g or more. The upper limit of the sulfur element content of the first organic expander is not particularly limited. From the viewpoint of further enhancing the effect of reducing the amount of overcharge, the sulfur element content of the first organic expander is preferably 9,000 μmol/g or less, and more preferably 8,000 μmol/g or less.

The content of the sulfur element of the first organic expander may be, for example, 2,000 μmol/g or more (or 3,000 μmol/g or more) and 9,000 μmol/g or less, or 2,000 μmol/g or more (or 3,000 μmol/g or more) and 8,000 μmol/g or less.

The first organic expander may contain a condensate containing a unit of an aromatic compound having a sulfur-containing group, and the condensate may contain at least a unit of a bisphenol compound as the unit of the aromatic compound.

A weight average molecular weight (Mw) of the first organic expander is preferably 7,000 or more. The Mw of the first organic expander is, for example, 100,000 or less, and may be 20,000 or less.

The negative electrode material can contain, for example, the organic expander (second organic expander) having a sulfur element content of less than 2,000 μmol/g. Examples of the second organic expander include lignin compounds, and synthetic organic expanders (in particular, lignin compounds) among the organic expanders described above. The sulfur element content of the second organic expander is preferably 1,000 μmol/g or less, and may be 800 μmol/g or less. The lower limit of the sulfur element content in the second organic expander is not particularly limited, and is, for example, 400 μmol/g or more.

The Mw of the second organic expander is, for example, less than 7,000. The Mw of the second organic expander is, for example, 3,000 or more.

The negative electrode material may contain the first organic expander and the second organic expander. When the first organic expander and the second organic expander are used in combination, the mass ratio thereof can be arbitrarily selected.

The content of the organic expander contained in the negative electrode material is, for example, 0.005% by mass or more, and may be 0.01% by mass or more or 0.1% by mass or more. When the content of the organic expander is within such a range, higher low-temperature HR discharge performance is easily obtained. The content of the organic expander is, for example, 1.0% by mass or less and may be 0.5% by mass or less.

The content of the organic expander contained in the negative electrode material may be 0.005% by mass or more (or 0.01% by mass or more) and 1.0% by mass or less, 0.005% by mass or more (or 0.01% by mass or more) and 0.5% by mass or less, or 0.1% by mass or more and 1.0% by mass or less (or 0.5% by mass or less).

(Carbonaceous Material)

As the carbonaceous material contained in the negative electrode material, carbon black, graphite, hard carbon, soft carbon, and the like can be used. Examples of the carbon black include acetylene black, furnace black, and lamp black. Furnace black also includes ketjen black (product name). The graphite may be a carbonaceous material including a graphite-type crystal structure and may be either artificial graphite or natural graphite. The negative electrode material may contain one kind or two or more kinds of carbonaceous materials.

The content of the carbonaceous material in the negative electrode material is, for example, 0.05% by mass or more and may be 0.1% by mass or more. When the content of the carbonaceous material is 0.1% by mass or more, self discharge tends to increase. However, even in such a case, according to the lead-acid batteries of the first aspect and the second aspect, the self discharge can be suppressed to a low level. The content of the carbonaceous material in the negative electrode material is, for example, 5% by mass or less and may be 3% by mass or less. From the viewpoint of further reducing the self discharge, the content of the carbonaceous material in the negative electrode material is preferably 1.2% by mass or less.

The content of the carbonaceous material in the negative electrode material may be 0.05% by mass or more and 5% by mass or less, 0.05% by mass or more and 3% by mass or less (or 1.2% by mass or less), 0.1% by mass or more and 5% by mass or less, or 0.1% by mass or more and 3% by mass or less (or 1.2% by mass or less).

(Barium Sulfate)

The content of barium sulfate in the negative electrode material is, for example, 0.05% by mass or more and may be 0.10% by mass or more. The content of barium sulfate in the negative electrode material is, for example, 3% by mass or less and may be 2% by mass or less.

The content of barium sulfate in the negative electrode material may be 0.05% by mass or more and 3% by mass or less, 0.05% by mass or more and 2% by mass or less, 0.10% by mass or more and 3% by mass or less, or 0.10% by mass or more and 2% by mass or less.

(Analysis of Constituent Components of Negative Electrode Material)

Hereinafter, a method of analyzing the negative electrode material or constituent components thereof will be described. Prior to measurement or analysis, the lead-acid battery in the full charge state is disassembled to obtain a negative electrode plate to be analyzed. The obtained negative electrode plate is washed with water to remove sulfuric acid from the negative electrode plate. The washing with water is performed until it is confirmed that color of a pH test paper does not change by pressing the pH test paper against the surface of the negative electrode plate washed with water. However, the washing with water is performed within two hours. The negative electrode plate washed with water is dried at $60\pm5°$ C. in a reduced pressure environment for about six hours. When the negative electrode plate includes a sticking member, the sticking member is removed as necessary. Next, the negative electrode material is separated from the negative electrode plate to obtain a sample (hereinafter referred to as sample A). The sample A is ground as necessary and subjected to analysis.

(1) Analysis of Polymer Compound (1-1) Qualitative Analysis of Polymer Compound (a) Analysis of Oxy $C_{2-4}$ Alkylene Unit Ground sample A is used. $150.0\pm0.1$ mL of chloroform is added to $100.0\pm0.1$ g of the sample A, and the mixture is stirred at $20\pm5°$ C. for sixteen hours to extract the polymer compound. Thereafter, the solid is removed by filtration. For a chloroform solution in which the polymer compound obtained by the extraction is dissolved or the polymer compound obtained by drying the chloroform solution, information is obtained from at least one selected from an infrared spectroscopic spectrum, an ultraviolet-visible absorption spectrum, a NMR spectrum, and LC-MS and pyrolysis GC-MS to specify the polymer compound.

Chloroform is distilled off under reduced pressure from the chloroform solution in which the polymer compound obtained by the extraction is dissolved to recover a chloroform soluble component. The chloroform soluble component is dissolved in deuterated chloroform, and a $^1$H-NMR spectrum is measured under the following conditions. From this $^1$H-NMR spectrum, a peak with a chemical shift in the range of 3.2 ppm or more and 3.8 ppm or less is confirmed. Also, from the peak in this range, the type of the oxy $C_{2-4}$ alkylene unit is specified.

Apparatus: type AL400 nuclear magnetic resonance spectrometer, manufactured by JEOL Ltd.
    Observation frequency: 395.88 MHz
    Pulse width: 6.30 μs
    Pulse repeating time: 74.1411 seconds
    Number of integrations: 32
    Measurement temperature: room temperature (20 to 35° C.)
    Reference: 7.24 ppm
    Sample tube diameter: 5 mm From the $^1$H-NMR spectrum, an integrated value ($V_1$) of the peak at which the chemical shift is present in the range of 3.2 ppm or more and 3.8 ppm or less is determined. In addition, for each of the hydrogen atoms of the —$CH_2$— group and the —CH< group bonded to the oxygen atom bonded to the terminal group of the polymer compound, the sum ($V_2$) of integrated values of peaks in the $^1$H-NMR spectrum is determined. Then, from $V_1$ and $V_2$, a ratio of $V_1$ to the sum of $V_1$ and $V_2$ (=$V_1/(V_1+V_2)\times100(\%)$) is determined.

When the integrated value of the peak in the $^1$H-NMR spectrum is determined in the qualitative analysis, two points having no significant signal are determined so as to sandwich the corresponding peak in the $^1$H-NMR spectrum, and each integrated value is calculated using a straight line connecting the two points as a baseline. For example, for the peak in which the chemical shift is present in a range of 3.2 ppm to 3.8 ppm, a straight line connecting two points of 3.2 ppm and 3.8 ppm in the spectrum is used as a baseline. For example, for a peak in which the chemical shift is present in a range of more than 3.8 ppm and 4.0 ppm or less, a straight line connecting two points of 3.8 ppm and 4.0 ppm in the spectrum is used as a baseline.

(b) Analysis of Hydrophobic Group in Esterified Product

When the polymer compound is an esterified product of a hydroxy compound, a predetermined amount of the polymer compound obtained by drying a chloroform solution in which the polymer compound obtained by extraction is dissolved in (a) is taken, and an aqueous potassium hydroxide solution is added. This saponifies the esterified product to generate a fatty acid potassium salt and a hydroxy compound. The aqueous potassium hydroxide solution is added until completion of the saponification. To the resulting mixture, methanol and a solution of boron trifluoride are added, and the mixture is stirred to convert the fatty acid potassium salt into fatty acid methyl ester. The resulting mixture is analyzed by pyrolysis GC-MS under the following conditions to identify a hydrophobic group contained in the esterified product.

Analyzer: high-performance general-purpose gas chromatogram GC-2014 manufactured by Shimadzu Corporation
    Column: DEGS (diethylene glycol succinic acid ester) 2.1 m
    Oven temperature: 180 to 120° C.
    Inlet temperature: 240° C.
    Detector temperature: 240° C.
    Carrier gas: He (flow rate: 50 mL/min)
    Injection amount: 1 μL to 2 μL (c) Analysis of Hydrophobic Group in Etherified Product When the polymer compound is an etherified product of a hydroxy compound, a predetermined amount of the polymer compound obtained by drying a chloroform solution in which the polymer compound obtained by extraction is dissolved in (a) is taken, and hydrogen iodide is added. This generates an iodide ($R^3I$) corresponding to the organic group of the ether moiety of the polymer compound ($R^3$ described above), and also produces a diiodo $C_{2-4}$ alkane corresponding to the oxy $C_{2-4}$ alkylene unit. The hydrogen iodide is added in an amount sufficient to complete conversion of the etherified to the iodide and the diiodo $C_{2-4}$ alkane. The resulting mixture is analyzed by pyrolysis GC-MS under the same conditions as in (b) to identify a hydrophobic group present in the etherified product.

(1-2) Quantitative Analysis of Polymer Compound

An appropriate amount of the chloroform soluble component is dissolved in deuterated chloroform together with tetrachloroethane (TCE) of $m_r$ (g) measured with an accuracy of ±0.0001 g, and a $^1$H-NMR spectrum is measured. An integrated value ($S_a$) of the peak in which the chemical shift is present in the range of 3.2 to 3.8 ppm and an integrated value ($S_r$) of a peak derived from TCE are determined, and mass-based content $C_n$ (ppm) of the polymer compound in the negative electrode material is determined from the following formula.

$$C_n = S_a/S_r \times N_r/N_a \times M_a/M_r \times m_r/m \times 1{,}000{,}000$$

wherein $M_a$ is a molecular weight of a structure showing a peak in a chemical shift range of 3.2 to 3.8 ppm (more specifically, a molecular weight of the repeating structure of oxy $C_{2-4}$ alkylene units), and $N_a$ is the number of hydrogen atoms bonded to a carbon atom of a main chain of the repeating structure. $N_r$ and $M_r$ are the number of hydrogen contained in a molecule of reference substance and the molecular weight of the reference substance, respectively, and m (g) is the mass of the negative electrode material used for extraction.

Since the reference substance in this analysis is TCE, $N_r=2$ and $M_r=168$. In addition, m=100.

For example, when the polymer compound is polypropylene glycol, $M_a$ is 58, and $N_a$ is 3. When the polymer compound is polyethylene glycol, $M_a$ is 44, and $N_a$ is 4. In the case of a copolymer, $N_a$ and $M_a$ are values obtained by averaging $N_a$ values and $M_a$ values, respectively, of each monomer unit using a molar ratio (mol %) of each monomer unit contained in the repeating structure.

In the quantitative analysis, the integrated value of the peak in the $^1$H-NMR spectrum is determined using data processing software "ALICE" manufactured by JEOL Ltd.

(1-3) Measurement of Mn of Polymer Compound

Using the chloroform soluble component, GPC measurement of the polymer compound is performed under the following conditions using the following apparatuses. Separately, a calibration curve (standard curve) is prepared from a plot of Mn of the standard substance and elution time. The Mn of the polymer compound is calculated based on the standard curve and the GPC measurement result of the polymer compound. However, the esterified product, the etherified product, and the like may be decomposed in the chloroform soluble component.

Analysis system: 20A system (manufactured by Shimadzu Corporation)
    Column: two columns of GPC KF-805L (manufactured by Shodex) connected in series
    Temperature: 30° C.±1° C.
    Mobile phase: tetrahydrofuran
    Flow rate: 1 mL/min.
    Concentration: 0.20% by mass
    Injection amount: 10 μL
    Standard substance: polyethylene glycol (Mn=2,000,000, 200,000, 20,000, 2,000, 200)

Detector: differential refractive index detector (Shodex RI-201H, manufactured by Shodex)

(2) Analysis of Organic Expander (2-1) Qualitative Analysis of Organic Expander in Negative Electrode Material The pulverized sample A is immersed in a 1 mol/L sodium hydroxide aqueous solution to extract the organic expander. Next, the first organic expander and the second organic expander are separated from the extract if necessary. For each separated material containing each organic expander, insoluble components are removed by filtration, and the obtained solution is desalted, then concentrated, and dried. The desalination is performed by using a desalination column, by causing the solution to pass through an ion-exchange membrane, or by placing the solution in a dialysis tube and immersing the solution in distilled water. The solution is dried to obtain a powder sample (hereinafter, referred to as a sample B) of the organic expander.

A type of the organic expander is determined from a combination of information obtained from, for example, an infrared spectroscopic spectrum measured using the sample B of the organic expander obtained as described above, an ultraviolet-visible absorption spectrum measured by an ultraviolet-visible absorption spectrometer after the sample B is diluted with distilled water or the like, a NMR spectrum of a solution obtained by dissolving the sample B in a predetermined solvent such as heavy water, or pyrolysis GC-MS enabling acquirement of information of individual compounds forming a substance.

The first organic expander and the second organic expander are separated from the extract as follows. First, the extract is measured by infrared spectroscopy, NMR, and/or GC-MS to determine whether or not a plurality of types of organic expanders are contained. Next, a molecular weight distribution is measured by GPC analysis of the extract, and if the plurality of types of organic expanders can be separated by molecular weight, the organic expander is separated by column chromatography based on a difference in molecular weight. When it is difficult to separate the organic expander due to the difference in molecular weight, one of the organic expanders is separated by a precipitation separation method using a difference in solubility that varies depending on the type of the functional group and/or the amount of the functional group of the organic expander. Specifically, an aqueous sulfuric acid solution is added dropwise to a mixture obtained by dissolving the extract in an NaOH aqueous solution to adjust the pH of the mixture, thereby aggregating and separating one of the organic expanders. The insoluble component is removed by filtration as described above from a mixture obtained by dissolving the separated material again in the NaOH aqueous solution. The remaining solution after separating one of the organic expanders is concentrated. The obtained concentrate contains the other organic expander, and the insoluble component is removed from the concentrate by filtration as described above.

(2-2) Quantitative Determination of Content of Organic Expander in Negative Electrode Material Similarly to (2-1) above, for each separated material containing the organic expander, a solution is obtained after removing the insoluble component by filtration. The ultraviolet-visible absorption spectrum of each obtained solution is measured. The content of each organic expander in the negative electrode material is determined using an intensity of a characteristic peak of each organic expander and a calibration curve prepared in advance.

When a lead-acid battery in which the content of the organic expander is unknown is obtained and the content of the organic expander is measured, a structural formula of the organic expander cannot be strictly specified, so that the same organic expander may not be used for the calibration curve. In this case, the content of the organic expander is measured using the ultraviolet-visible absorption spectrum by creating a calibration curve using the organic expander extracted from the negative electrode of the battery and a separately available organic polymer in which the ultraviolet-visible absorption spectrum, the infrared spectroscopic spectrum, the NMR spectrum, and the like exhibit similar shapes.

(2-3) Content of Sulfur Element in Organic Expander

Similarly to (2-1) above, after the sample B of the organic expander is obtained, sulfur element in 0.1 g of the organic expander is converted into sulfuric acid by an oxygen combustion flask method. At this time, the sample B is burned in a flask containing an adsorbent to obtain an eluate in which sulfate ions are dissolved in the adsorbent. Next, the eluate is titrated with barium perchlorate using thorin as an indicator to determine the content ($c1$) of the sulfur element in 0.1 g of the organic expander. Next, $c1$ is multiplied by 10 to calculate the content ($\mu mol/g$) of the sulfur element in the organic expander per 1 g.

(2-4) Mw Measurement of Organic Expander

Similarly to (2-1) above, after the sample B of the organic expander is obtained, GPC measurement of the organic expander is performed under the following conditions using the following apparatus. Separately, a calibration curve (standard curve) is prepared from a plot of Mw of the standard substance and elution time. The Mw of the organic expander is calculated on the basis of the standard curve and the GPC measurement result of the organic expander.

GPC apparatus: Build-up GPC system SD-8022/DP-8020/AS-8020/CO-8020/UV-8020 (manufactured by Tosoh Corporation)

Column: TSKgel G4000SWXL, G2000SWXL (7.8 mm I.D.×30 cm) (manufactured by Tosoh Corporation)

Detector: UV detector, $\lambda=210$ nm

Eluent: Mixed solution of NaCl aqueous solution having a concentration of 1 mol/L: acetonitrile (volume ratio=7:3)

Flow rate: 1 mL/min.

Concentration: 10 mg/mL

Injection amount: 10 $\mu L$

Standard substance: Na polystyrene sulfonate (Mw=275, 000, 35,000, 12,500, 7,500, 5,200, 1,680)

(3) Quantitative Determination of Carbonaceous Material and Barium Sulfate

To 10 g of the ground sample A, 50 ml of nitric acid having a concentration of 20% by mass is added and heated for about twenty minutes to dissolve the lead component as lead ions. The resulting solution is filtered, and solids such as carbonaceous materials and barium sulfate are filtered off.

The obtained solid is dispersed in water to form a dispersion, and then components except for the carbonaceous material and barium sulfate (e.g., reinforcing material) are removed from the dispersion by using a sieve. Next, the dispersion is subjected to suction filtration using a membrane filter with its mass measured in advance, and the membrane filter is dried with the filtered sample in a dryer at 110° C.±5° C. The filtered sample is a mixed sample of the carbonaceous material and barium sulfate. The mass of the membrane filter is subtracted from the total mass of the mixed sample (hereinafter, referred to as sample C) and the membrane filter after drying to measure the mass of sample C ($M_m$). Thereafter, sample C is placed in a crucible together with a membrane filter and is burned and incinerated at 1,300° C. or higher. The residue remaining is barium oxide. The mass of barium sulfate ($M_B$) is determined by converting the mass of barium oxide to the mass of barium sulfate. The mass of the carbonaceous material is calculated by subtracting the mass $M_B$ from the mass $M_m$.

(Others)

The negative electrode plate can be prepared by such a manner that a negative current collector is coated or filled with a negative electrode paste, which is then cured and dried to fabricate a non-formed negative electrode plate, and thereafter, the non-formed negative electrode plate is formed. The negative electrode paste is prepared, for example, by adding water and sulfuric acid (or aqueous sulfuric acid solution) to a lead powder, the polymer compound, and if necessary, at least one selected from a group consisting of an organic expander, a carbonaceous material, and other additives, and mixing the mixture. At the time of curing, it is preferable to cure the non-formed negative electrode plate at a higher temperature than room temperature and high humidity.

The formation can be performed, for example, by housing the element including the non-formed negative electrode plate and the electrolyte solution containing sulfuric acid in the container of the lead-acid battery and charging the element in a state where the electrolyte solution is soaked into the element. However, the formation may be performed before the lead-acid battery or the element is assembled. The formation produces spongy lead.

(Positive Electrode Plate)

The positive electrode plate of a lead-acid battery can be classified into a paste type, a clad type, and the like. Either a paste-type or a clad-type positive electrode plate may be used. The paste-type positive electrode plate includes a positive current collector and a positive electrode material. The configuration of the clad-type positive electrode plate is as described above.

The positive current collector may be prepared by casting lead (Pb) or a lead alloy, or may be prepared by processing a lead sheet or a lead alloy sheet. Examples of the processing method include expanding processing and punching processing. It is preferable to use a grid-shaped current collector as the positive current collector because the positive electrode material is easy to support.

As a lead alloy used for the positive current collector, a Pb—Sb-based alloy, a Pb—Ca-based alloy, or a Pb—Ca—Sn-based alloy are preferred in terms of corrosion resistance and mechanical strength. The positive current collector may include a surface layer. The surface layer and the inner layer of the positive current collector may have different compositions. The surface layer may be prepared in a part of the positive current collector. The surface layer may be prepared only on the grid part, only on the lug part, or only on the frame rib part of the positive current collector.

The positive electrode material contained in the positive electrode plate contains a positive active material (lead dioxide or lead sulfate) that exhibits a capacity through a redox reaction. The positive electrode material may contain another additive as needed.

In the lead-acid battery, the density of the positive electrode material is 3.70 g/cm³ or more, and may be 3.72 g/cm³ or more. By setting the density of the positive electrode material within such a range, self discharge can be reduced. From the viewpoint of synergistically reducing the self discharge, the density of the positive electrode material is preferably 3.74 g/cm³ or more. The density of the positive electrode material is 4.65 g/cm³ or less, and may be 4.5 g/cm³ or less. By setting the density of the positive electrode material within such a range, self discharge can be reduced. From the viewpoint of synergistically reducing the self discharge, the density of the positive electrode material is preferably 4.40 g/cm³ or less, more preferably 4.30 g/cm³ or less.

The density of the positive electrode material may be 3.70 g/cm³ or more and 4.65 g/cm³ or less (or 4.5 g/cm³ or less), 3.72 g/cm³ or more and 4.65 g/cm³ or less (or 4.5 g/cm³ or less), 3.74 g/cm³ or more and 4.65 g/cm³ or less (or 4.5 g/cm³ or less), 3.70 g/cm³ or more and 4.40 g/cm³ or less (or 4.30 g/cm³ or less), 3.72 g/cm³ or more and 4.40 g/cm³ or less (or 4.30 g/cm³ or less), or 3.74 g/cm³ or more and 4.40 g/cm³ or less (or 4.30 g/cm³ or less).

A non-formed paste-type positive electrode plate is obtained by filling a positive current collector with a positive electrode paste, and curing and drying the paste. The positive electrode paste is prepared by mixing lead powder, an additive, water, and sulfuric acid. A non-formed clad-type positive electrode plate is prepared by filling a porous tube, into which a spine connected by a current collector is inserted with a lead powder or a slurry-like lead powder, and joining a plurality of tubes with a spine protector. Thereafter, the positive electrode plate is obtained by forming the non-formed positive electrode plates. The density of the positive electrode material can be adjusted by adjusting the amount of lead powder, the amount of water, the amount of sulfuric acid, and the like in the positive electrode paste.

The formation can be performed, for example, by housing the element including the non-formed positive electrode plate and the electrolyte solution containing sulfuric acid in the container of the lead-acid battery and charging the element in the state where the electrolyte solution is soaked into the element. However, the formation may be performed before the lead-acid battery or the element is assembled.

(Measurement of Density of Positive Electrode Material)

Hereinafter, a method of measuring the density of the positive electrode material will be described. Prior to measurement or analysis, the lead-acid battery in the full charge state is disassembled to obtain a positive electrode plate to be analyzed. The obtained positive electrode plate is washed with water and dried to remove the electrolyte solution in the positive electrode plate. Subsequently, the positive electrode material is separated from the vicinity of the center of the positive electrode plate in the planar direction to obtain an unground sample (sample D).

The density (bulk density) of the unground sample D is determined by a mercury intrusion method using a mercury porosimeter. More specifically, first, a predetermined amount of the unground sample D is taken, and the mass thereof is measured. The sample D is charged into a measurement container of a mercury porosimeter, evacuated under reduced pressure, and then filled with mercury at a pressure of 0.5 psia or more and 0.55 psia or less (≈3.45 kPa or more and 3.79 kPa or less) to measure a bulk volume of the sample D and the measured mass of the sample D is divided by the volume to determine the bulk density of the positive electrode material. A volume obtained by subtracting a mercury injection volume from a volume of the measurement container is defined as the bulk volume. As the mercury porosimeter, an automatic porosimeter (AutoPore IV 9505) manufactured by Shimadzu Corporation is used. When the element includes one positive electrode plate, the density of the positive electrode material is determined for a positive electrode material taken from the positive electrode plate. When the element includes two positive electrode plates, the density of the positive electrode material is an average of values determined for positive electrode materials taken from two positive electrode plates, respectively. When the element includes three or more positive electrode plates, the density of the positive electrode material is an average of values determined for positive electrode materials taken from two positive electrode plates arbitrarily selected from positive electrode plates other than the plates at both ends of the element. It is to be noted that when two of the three positive electrode plates are plates at both ends of the element, the density of the positive electrode material is determined for a positive electrode material taken from the remaining one positive electrode plate.

(Separator)

The lead-acid battery usually includes a separator interposed between a negative electrode plate and a positive electrode plate. The separator is prepared by a nonwoven fabric. The nonwoven fabric is a mat in which fibers are intertwined without being woven and is mainly made of fibers. In the nonwoven fabric, for example, 60% by mass or more of the nonwoven fabric is prepared by fibers. The nonwoven fabric may contain components in addition to the fibers, such as acid-resistant inorganic powder (for example, silica powder, glass powder, diatomaceous earth), a polymer as a binder, and the like.

As the fibers, glass fibers, organic fibers, and the like can be used. As the organic fibers, a fiber material insoluble in the electrolyte solution is used. Examples of the organic fibers include polymer fibers (polyolefin fiber, acrylic fiber, polyester fiber (polyethylene terephthalate fiber, or the like), and the like), and pulp fibers.

The nonwoven fabric preferably contains at least glass fibers. The nonwoven fabric containing glass fibers is also referred to as an AGM (Absorbed Glass Mat) separator. The nonwoven fabric may include glass fibers and organic fibers. The ratio of the glass fiber to the entire fibers constituting the nonwoven fabric is preferably 60% by mass or more.

The separator may be prepared by only a nonwoven fabric. The separator may be, when required, a laminate of a nonwoven fabric and a microporous membrane, a laminate of a nonwoven fabric and a material different from or the same as the nonwoven fabric, or a product obtained by engaging recesses and projections to each other with a nonwoven fabric and a material different from or the same as the nonwoven fabric.

The microporous membrane is a porous sheet mainly made of components except for fiber components and is obtained by, for example, extrusion molding a composition containing, for example, a pore-forming additive into a sheet shape and then removing the pore-forming additive to form pores. The microporous membrane is preferably prepared by a material having acid resistance, and is preferably a micropore composed mainly of a polymer component. As the polymer component, a polyolefin (a polyethylene, a polypropylene, etc.) is preferable. Examples of the pore-forming additive include at least one selected from a group consisting of a polymer powder and oil.

The thickness of separators interposed between the negative electrode plate and the positive electrode plate may be selected in accordance with the inter-electrode distance. The number of separators may be selected according to the number of the electrode gaps.

(Electrolyte Solution)

The electrolyte solution is an aqueous solution containing sulfuric acid and may be gelled as necessary.

The polymer compound may be contained in the electrolyte solution.

The electrolyte solution may contain cations (for example, metal cations) and/or anions (for example, anions other than sulfate anions (such as phosphate ions)) if necessary. Examples of the metal cation include at least one selected from a group consisting of a Na ion, a Li ion, a Mg ion, and an Al ion.

The specific gravity of the electrolyte solution in the lead-acid battery in the full charge state at 20° C. is, for example, 1.20 or more and may be 1.25 or more. The specific gravity of the electrolyte solution at 20° C. is 1.35 or less and preferably 1.32 or less.

The specific gravity of the electrolyte solution at 20° C. may be 1.20 or more and 1.35 or less, 1.20 or more and 1.32 or less, 1.25 or more and 1.35 or less, or 1.25 or more and 1.32 or less.

(Others)

The lead-acid battery can be obtained by a manufacturing method including a step of storing an element and an electrolyte solution in a cell chamber of a container. Each cell of the lead-acid battery includes an element and an electrolyte solution stored in each cell chamber. The element is assembled by stacking a positive electrode plate, a negative electrode plate, and a separator such that the separator is interposed between the positive electrode plate and the negative electrode plate prior to storage in the cell chamber. The positive electrode plate, the negative electrode plate, the electrolyte solution, and the separator are each prepared prior to assembly of the element. A method of manufacturing the lead-acid battery may include a step of forming at least one of the positive electrode plate and the negative electrode plate as necessary after a step of storing the element and the electrolyte solution in the cell chamber.

The number of plates in the element included in one cell may be one or two or more. In the cell for determining the density of the positive electrode material, when the element includes two or more negative electrode plates, it is preferable to satisfy the condition that in at least one negative electrode plate, the negative electrode material contains the polymer compound, and the density of the positive electrode material of the cell is in the above range. In this case, the effect of reducing self discharge is obtained according to the number of the negative electrode plates. From the viewpoint of further reducing the self discharge, 50% or more (more preferably 80% or more or 90% or more) of the number of negative electrode plates included in the element is preferably the negative electrode plate including the polymer compound. Among the negative electrode plates included in the element, a ratio of the negative electrode plates including the polymer compound is 100% or less. All of the negative electrode plates included in the element may be negative electrode plates containing the polymer compound.

When the lead-acid battery has two or more cells, it is sufficient that at least the element of the cell for determining the density of the positive electrode material includes the negative electrode plate containing the polymer compound. From the viewpoint of further reducing self discharge, it is preferable that in 50% or more (more preferably 80% or more or 90% or more) of the number of cells included in the lead-acid battery, the density of the positive electrode material is within the above range, and the element including the negative electrode plate containing the polymer compound is included. Among the cells included in the lead-acid battery, the density of the positive electrode material is within the above range, and the ratio of cells including the element including the negative electrode plate containing the polymer compound is 100% or less. It is preferable that in all of the elements included in the lead-acid battery, the density of the positive electrode material is within the above range, and the element including the negative electrode plate containing the polymer compound is included.

FIG. 1 is a cross-sectional view schematically illustrating a structure of an example of a valve regulated lead-acid battery. In FIG. 1, a lead-acid battery 1 includes a container 10 that accommodates an element 11 and an electrolyte solution (not illustrated). An upper opening of the container 10 is closed by a lid 12. The element 11 is configured by laminating a plurality of negative electrode plates 2 and a plurality of positive electrode plates 3 with a separator 4 interposed therebetween.

An upper part of each of the plurality of negative electrode plates 2 is provided with a current collection lug part (not illustrated) projecting upward. An upper portion of each of the plurality of positive electrode plates 3 is also provided with a current collection lug (not illustrated) projecting upward. The lug parts of the negative electrode plates 2 are connected and integrated with each other by a negative electrode strap (not illustrated). Similarly, the lug parts of the positive electrode plates 3 are also connected and integrated with each other by a positive electrode strap (not illustrated). The negative electrode strap is connected to a negative pole (not illustrated) serving as an external terminal, and the positive electrode strap is connected to a positive pole (not illustrated) serving as an external terminal.

The container 10 is divided into a plurality of (three in the illustrated example) cell chambers 10R independent from each other, and one element 11 is housed in each of the cell chambers 10R. The lid 12 includes an independent exhaust valve 13 for each of the cell chambers 10R. When an internal pressure of the cell chamber 10R exceeds a predetermined upper limit value, the exhaust valve 13 is opened to directly release gas from the cell chamber 10R to the outside. When the internal pressure of the cell chamber 10R is equal to or lower than the upper limit value, oxygen generated in the positive electrode plate 3 is reduced in the negative electrode plate 2 in the same cell chamber 10R to generate water.

The structure of the valve regulated lead-acid battery is not limited to the above. For example, although the case of each cell exhaust type is illustrated in FIG. 1, a collective exhaust type may be used in which a lid includes a collective exhaust chamber communicating with each cell chamber and the collective exhaust chamber includes a smaller number of exhaust valves (for example, one exhaust valve) than the number of cell chambers.

In the present specification, each of the self discharge and the low-temperature HR discharge performance is evaluated by the following procedure. A test battery used for the evaluation has a rated voltage of 12 V and a rated 10-hour rate capacity of 5 Ah.

(a) Evaluation 1: Self Discharge

The test battery in the full charge state is discharged at a discharge current of 0.5 A and 25° C.±2° C. until the terminal voltage reaches 1.75 V/cell, and the discharge capacity (initial capacity) at this time is determined. Next, an electric quantity of 130% with respect to the discharge capacity is charged to the lead-acid battery under the conditions of 25° C.±2° C. and 0.5 A to bring the lead-acid battery into the full charge state. The fully charged lead-acid battery is stored at 40° C.±2° C. for 30 days. The lead-acid battery after storage is discharged under the same conditions as described above, the discharge capacity at this time is obtained, and a decrease from the initial capacity is obtained as self discharge.

(b) Evaluation 2: Low-Temperature HR Discharge Performance

The test battery in the full charge state is discharged at a discharge current of 50 A at −10° C.±2° C. until the terminal voltage reaches 1.0 V/cell, and the discharge time (initial low-temperature HR discharge duration time) (s) at this time is obtained. The low-temperature HR discharge performance is evaluated based on the low-temperature HR discharge duration time.

The lead-acid battery according to one aspect of the present invention will be described below.

(1) A valve regulated lead-acid battery including at least one cell including an element and an electrolyte solution, wherein the element includes a negative electrode plate, a positive electrode plate, and a separator interposed between the negative electrode plate and the positive electrode plate, the negative electrode plate includes a negative electrode material, the negative electrode material contains a polymer compound having a peak in a range of 3.2 ppm or more and 3.8 ppm or less in a chemical shift of a $^1$H-NMR spectrum measured using deuterated chloroform as a solvent, the positive electrode plate includes a positive electrode material, and a density of the positive electrode material is 3.70 g/cm$^3$ or more and 4.65 g/cm$^3$ or less.

(2) In (1), the polymer compound may contain an oxygen atom bonded to a terminal group and a —CH$_2$— group and/or a —CH< group bonded to the oxygen atom, and in the $^1$H-NMR spectrum, a ratio of an integrated value of the peak to a sum of the integrated value of the peak, an integrated value of a peak of a hydrogen atom of the —CH$_2$— group, and an integrated value of a peak of a hydrogen atom of the —CH< group may be 85% or more.

(3) In (1) or (2), the polymer compound may have a repeating structure of oxy C$_{2-4}$ alkylene units.

(4) A valve regulated lead-acid battery including at least one cell including an element and an electrolyte solution, wherein the element includes a negative electrode plate, a positive electrode plate, and a separator interposed between the negative electrode plate and the positive electrode plate, the negative electrode plate includes a negative electrode material, the negative electrode material contains a polymer compound having a repeating structure of oxy C$_{2-4}$ alkylene units, the positive electrode plate includes a positive electrode material, and a density of the positive electrode material is 3.70 g/cm$^3$ or more and 4.65 g/cm$^3$ or less.

(5) In any one of (1) to (4), the density of the positive electrode material may be 3.72 g/cm$^3$ or more, or 3.74 g/cm$^3$ or more.

(6) In any one of (1) to (5), the density of the positive electrode material may be 4.5 g/cm$^3$ or less, 4.40 g/cm$^3$ or less, or 4.30 g/cm$^3$ or less.

(7) In any one of (1) to (6), a content of the polymer compound in the negative electrode material may be 8 ppm or more, 10 ppm or more, 20 ppm or more, or 30 ppm or more on a mass basis.

(8) In any one of (1) to (7), the content of the polymer compound in the negative electrode material may be 1,000 ppm or less, 500 ppm or less, 450 ppm or less, 420 ppm or less, 370 ppm or less, or 350 ppm or less on a mass basis.

(9) In any one of (1) to (8), the polymer compound may contain a compound having Mn of 5,000,000 or less, 1,000, 000 or less, 100,000 or less, 20,000 or less, 10,000 or less, 5,000 or less, 3,000 or less, 2,500 or less, or 2,000 or less.

(10) In any one of (1) to (9), the polymer compound may contain a compound having Mn of 300 or more, 400 or more, or 500 or more.

(11) In any one of (1) to (10), the polymer compound may contain at least one selected from a group consisting of a hydroxy compound having a repeating structure of oxy $C_{2-4}$ alkylene units, an etherified product of the hydroxy compound and an esterified product of the hydroxy compound, and the hydroxy compound may be at least one selected from a group consisting of a poly $C_{2-4}$ alkylene glycol, a copolymer having a repeating structure of oxy $C_{2-4}$ alkylene, and a poly $C_{2-4}$ alkylene oxide adduct of a polyol.

(12) In any one of (1) to (11), the polymer compound may have a repeating structure of oxypropylene units.

(13) In (12), the polymer compound may include at least one selected from a group consisting of polypropylene glycol, polyoxypropylene-polyoxyethylene copolymer (such as polyoxypropylene-polyoxyethylene block copolymers), polypropylene glycol alkyl ether (such as alkyl ethers in which $R^2$ is an alkyl having 10 or less (or 8 or less or 6 or less) carbon atoms (such as methyl ether, ethyl ether and butyl ether)), polyoxyethylene-polyoxypropylene alkyl ether (such as alkyl ether in which $R^2$ is an alkyl having 10 or less (or 8 or less or 6 or less) carbon atoms (such as butyl ether and hydroxyhexyl ether)), polypropylene glycol carboxylate (such as polypropylene glycol carboxylate in which $R^3$ is an alkyl having 10 or less (or 8 or less or 6 or less) carbon atoms (such as polypropylene glycol acetate)), polypropylene oxide adduct of polyol with three or more hydroxyl groups (such as polypropylene oxide adduct of glycerin), and the like.

(14) In any one of (1) to (11), the polymer compound may have one or more hydrophobic groups, and at least one of the hydrophobic groups may be a long-chain aliphatic hydrocarbon group having 8 or more carbon atoms.

(15) In (14), the number of carbon atoms in the long-chain aliphatic hydrocarbon group may be 12 or more, or 16 or more.

(16) In (14) or (15), the number of carbon atoms in the long-chain aliphatic hydrocarbon group may be 30 or less, 26 or less, or 22 or less.

(17) In any one of (14) to (16), the polymer compound may have a repeating structure of oxyethylene units.

(18) In (18), the polymer compound may include at least one selected from a group consisting of an etherified product of polyethylene glycol (alkyl ether or the like), an esterified product of polyethylene glycol (carboxylic acid ester or the like), an etherified product of a polyethylene oxide adduct of a polyol (alkyl ether or the like), and an esterified product of a polyethylene oxide adduct of a polyol (polyol with three or more hydroxyl groups) (carboxylic acid ester or the like).

(19) In (17) or (18), the polymer compound may include at least one selected from a group consisting of polyethylene glycol oleate, polyethylene glycol dioleate, polyethylene glycol dilaurate, polyethylene glycol distearate, polyoxyethylene coconut oil fatty acid sorbitan, polyoxyethylene sorbitan oleate, polyoxyethylene sorbitan stearate, polyoxyethylene lauryl ether, polyoxyethylene tetradecyl ether and polyoxyethylene cetyl ether.

(20) In any one of (17) to (19), HLB of the polymer compound may be 4 or more, or 4.3 or more.

(21) In any one of (17) to (20), HLB of the polymer compound may be 18 or less, 10 or less, 9 or less, or 8.5 or less.

(22) In any one of (1) to (21), the negative electrode material may contain an organic expander.

(23) In any one of (1) to (22), the negative electrode material (or the organic expander) may contain a lignin compound.

(24) In any one of (1) to (23), the negative electrode material (or the organic expander) may contain a condensate of a bisarene compound.

(25) In any one of (22) to (24), a content of the organic expander in the negative electrode material may be 0.005% by mass or more, 0.01% by mass or more, or 0.1% by mass or more.

(26) In any one of (22) to (25), the content of the organic expander in the negative electrode material may be 1.0% by mass or less, or 0.5% by mass or less.

(27) In any one of (1) to (26), the negative electrode material may contain a carbonaceous material.

(28) In (27), a content of the carbonaceous material in the negative electrode material may be 0.05% by mass or more, or 0.1% by mass or more.

(29) In (27) or (28), the content of the carbonaceous material in the negative electrode material may be 5% by mass or less, 3% by mass or less, or 1.2% by mass or less.

(30) In any one of (1) to (29), the negative electrode material may contain barium sulfate.

(31) In (30), a content of the barium sulfate in the negative electrode material may be 0.05% by mass or more or 0.10% by mass or more.

(32) In (31), the content of the barium sulfate in the negative electrode material may be 3% by mass or less or 2% by mass or less.

(33) In any one of (1) to (32), a specific gravity of the electrolyte solution at 20° C. in the lead-acid battery in a fully charged state may be 1.20 or more, or 1.25 or more.

(34) In any one of (1) to (33), the specific gravity of the electrolyte solution at 20° C. in the lead-acid battery in a fully charged state may be 1.35 or less or 1.32 or less.

(35) In any one of (1) to (34), the lead-acid battery may be used for small mobility.

EXAMPLES

Hereinafter, the present invention is specifically described on the basis of examples and comparative examples, but the present invention is not limited to the following examples. <<Lead-Acid Batteries E1 to E34, R1 to R8, and C1 to C12>>
(1) Preparation of Lead-Acid Battery
(a) Preparation of Negative Electrode Plate A lead powder as a raw material, a polymer compound shown in the table, an organic expander, a carbonaceous material (carbon black), and barium sulfate are mixed with an appropriate amount of a sulfuric acid aqueous solution to obtain a negative electrode paste. At this time, the components are mixed so that the contents of the polymer compound, the organic expander, and the carbonaceous material in the negative electrode material, which are determined by the procedure described above, are the values shown in the table, and the content of barium sulfate is 0.4% by mass. A mesh portion of an expanded grid made of a Pb—Ca—Sn alloy is filled with the negative electrode paste, which is then cured and dried to obtain a non-formed negative electrode plate. The Mn of polypropylene glycol as the polymer compound determined by the procedure described above is 2,000. The Mn of polyethylene glycol oleic acid ester and the Mn of polyethylene glycol dilauric acid ester used in the preparation of the negative electrode material are 500 and 630, respectively.

As the organic expander shown in the table, the following components are used.

(e1) Lignin: Sodium ligninsulfonate (sulfur element content: 600 μmol/g, Mw 5500)

(e2) Condensate of bisphenol: condensate of a bisphenol compound including sulfonic acid group introduced with formaldehyde (sulfur element content: 3,330 μmol/g, Mw 9,600)

(b) Preparation of Positive Electrode Plate

Lead powder as raw material is mixed with a sulfuric acid aqueous solution to obtain a positive electrode paste. A mesh portion of an expanded grid made of a Pb—Ca—Sn alloy is filled with the positive electrode paste, which is then cured and dried to obtain a non-formed positive electrode plate.

For the lead-acid battery fully charged after formation, the concentration and amount of the aqueous sulfuric acid solution used for preparation of the positive electrode paste are controlled so that the density of the positive electrode material determined by the procedure described above is the value shown in the table.

(c) Preparation of Test Battery

A test battery has a rated voltage of 12 V and a rated 10-hour rate capacity of 5 Ah. An element of the test battery includes three positive electrode plates and four negative electrode plates. The positive electrode plate and the negative electrode plate are alternately stacked with a separator interposed therebetween to prepare an element. The element is housed into a container made of polypropylene together with an electrolyte solution (aqueous sulfuric acid solution) and hermetically sealed with a lid. As the separator, a fine glass mat is used. A valve regulated lead-acid battery is produced by subjecting the element to formation in the container. The lead-acid battery is fully charged by formation. The specific gravity of the electrolyte solution in the lead-acid battery in the full charge state at 20° C. is 1.32.

When the polymer compound has a repeating structure of oxyethylene units, a peak derived from —$CH_2$— of the oxyethylene unit is observed in a chemical shift range of 3.2 ppm or more and 3.8 ppm or less in a $^1$H-NMR spectrum of the polymer compound which is measured by the foregoing procedure. When the polymer compound has a repeating structure of oxypropylene units, a peak derived from —$CH_2$— of the oxypropylene unit is observed in a chemical shift range of 3.2 ppm or more and 3.42 ppm or less and a peak derived from —CH< and —$CH_2$— of the oxypropylene unit is observed in a chemical shift range of more than 3.42 ppm and 3.8 ppm or less in the $^1$H-NMR spectrum of the polymer compound which is measured by the foregoing procedure. In the $^1$H-NMR spectrum, a ratio of an integrated value of the peak of 3.2 ppm to 3.8 ppm to the sum of the integrated value of the peak of 3.2 ppm to 3.8 ppm, an integrated value of a peak of hydrogen atoms of the —$CH_2$— group bonded to the oxygen atom, and an integrated value of a peak of a hydrogen atom of the —CH< group bonded to the oxygen atom is 96 to 100%.

(2) Evaluation (a) Evaluation 1: Self Discharge

Self discharge of the produced lead-acid battery is evaluated by the procedure described above. The self discharge of each lead-acid battery is evaluated by a ratio when the self discharge of a lead-acid battery C1 is 100%. The smaller the ratio is, the less the self discharge is, and the more excellent it is.

(b) Evaluation 2: Low-Temperature HR Discharge Performance

The initial low-temperature HR discharge duration time (s) of the lead-acid battery in the full charge state is determined by the procedure described above. The low-temperature HR discharge performance of each lead-acid battery is evaluated by a ratio when the low-temperature HR discharge duration time of the lead-acid battery C1 is 100%. The larger the ratio is, the more excellent the low-temperature HR discharge performance is.

Tables 1 to 5 show the results. Table 2 also shows the HLB of the polymer compound. In Tables 1, 2, 4, and 5, a difference in self discharge from the lead-acid battery C1 is shown as a self discharge improvement rate. E1 to E34 correspond to examples. R1 to R8 correspond to reference examples. C1 to C12 correspond to comparative examples.

TABLE 1

| Battery No. | Positive electrode material density (g/cm³) | Polymer compound Type | Polymer compound Content (mass ppm) | Organic expander Type | Organic expander Content (mass %) | Carbonaceous material Content (mass %) | Self discharge (%) | Self discharge improvement rate (%) |
|---|---|---|---|---|---|---|---|---|
| C1 | 3.66 | — | 0 | Lignin | 0.25 | 0.3 | 100 | 0 |
| C2 | 3.74 | | | | | | 97 | 3 |
| C3 | 3.94 | | | | | | 92 | 8 |
| C4 | 4.17 | | | | | | 90 | 10 |
| C5 | 4.30 | | | | | | 94 | 6 |
| C6 | 4.65 | | | | | | 98 | 2 |
| R1 | 3.66 | PPG | 80 | Lignin | 0.25 | 0.3 | 90 | 10 |
| E1 | 3.74 | | | | | | 87 | 13 |
| E2 | 3.94 | | | | | | 80 | 20 |
| E3 | 4.17 | | | | | | 74 | 26 |
| E4 | 4.30 | | | | | | 78 | 22 |
| E5 | 4.65 | | | | | | 90 | 10 |
| R2 | 3.66 | PPG | 320 | Lignin | 0.25 | 0.3 | 88 | 12 |
| E6 | 3.74 | | | | | | 84 | 16 |
| E7 | 3.94 | | | | | | 77 | 23 |
| E8 | 4.17 | | | | | | 70 | 30 |
| E9 | 4.30 | | | | | | 75 | 25 |
| E10 | 4.65 | | | | | | 87 | 13 |

PPG: Polypropylene glycol

As shown in Table 1, by setting the density of the positive electrode material to 3.70 to 4.65 g/cm³, the self discharge is improved to some extent as compared with the case that the density is 3.66 g/cm³ (comparison of C1 with C2 to C6). By combining the positive electrode plate in which the density of the positive electrode material is 3.70 to 4.65 g/cm³ and the negative electrode plate including the negative electrode material containing the polymer compound, the effect of reducing the self discharge becomes remarkable (comparison of C2 to C6 with E1 to E10).

From the comparison of C1 with C2 to C6, the self discharge reducing effect obtained by setting the density of the positive electrode material from 3.66 g/cm³ to 3.70 to 4.65 g/cm³ is 2 to 10%. From the comparison between C1 and R2, the self discharge reducing effect obtained by using the negative electrode plate including the negative electrode material containing polypropylene glycol as the polymer compound in an amount of 320 ppm on a mass basis is 12%. For example, in E6 to E9, the self discharge is further reduced than the self discharge estimated from each of the density of the positive electrode material and the use of the polymer compound, and a synergistic effect is obtained. From the viewpoint of obtaining the synergistic effect, the density of the positive electrode material is preferably 3.74 g/cm³ or more. From the same viewpoint, the density of the positive electrode material is preferably 4.40 g/cm³ or less.

TABLE 2

| Battery No. | Positive electrode material density (g/cm³) | Polymer compound Type | Content (mass ppm) | Organic expander Type | Content (mass %) | Carbonaceous material Content (mass %) | Self discharge (%) | Self discharge improvement rate (%) |
|---|---|---|---|---|---|---|---|---|
| C1 | 3.66 | — | 0 | Lignin | 0.25 | 0.3 | 100 | 0 |
| C2 | 3.74 | | | | | | 97 | 3 |
| C3 | 3.94 | | | | | | 92 | 8 |
| C4 | 4.17 | | | | | | 90 | 10 |
| C5 | 4.30 | | | | | | 94 | 6 |
| C6 | 4.65 | | | | | | 98 | 2 |
| R3 | 3.66 | PEG | 190 | Lignin | 0.25 | 0.3 | 86 | 14 |
| E11 | 3.74 | oleic | | | | | 80 | 20 |
| E12 | 3.94 | acid | | | | | 67 | 33 |
| E13 | 4.17 | (HLB8.4) | | | | | 62 | 38 |
| E14 | 4.30 | | | | | | 65 | 35 |
| E15 | 4.65 | | | | | | 87 | 13 |
| R4 | 3.66 | PEG | 350 | Lignin | 0.25 | 0.3 | 85 | 15 |
| E16 | 3.74 | oleic | | | | | 77 | 23 |
| E17 | 3.94 | acid | | | | | 62 | 38 |
| E18 | 4.17 | (HLB8.4) | | | | | 59 | 41 |
| E19 | 4.30 | | | | | | 62 | 38 |
| E20 | 4.65 | | | | | | 86 | 14 |
| R5 | 3.66 | PEG | 300 | Lignin | 0.25 | 0.3 | 87 | 13 |
| E21 | 3.74 | dilauric | | | | | 80 | 20 |
| E22 | 3.94 | acid | | | | | 73 | 27 |
| E23 | 4.17 | (HLB6.6) | | | | | 65 | 35 |
| E24 | 4.30 | | | | | | 72 | 28 |
| E25 | 4.65 | | | | | | 86 | 14 |

PEG oleic adic: Polyethylene glycol oleic acid ester
PEG dilauric acid: Polyethylene glycol dilauric acid ester As shown in Table 2, in the case of using the polymer compound having the repeating structure of oxyethylene units, self discharge can be further reduced as compared with the case of using polypropylene glycol (comparison of E11 to E25 with E11 to E10 in Table 1).

TABLE 3

| Battery No. | Positive electrode material density (g/cm³) | Polymer compound Type | Content (mass ppm) | Organic expander Type | Content (mass %) | Carbonaceous material Content (mass %) | Self discharge (%) | Low-temperature HR discharge performance (%) |
|---|---|---|---|---|---|---|---|---|
| C1 | 3.66 | — | 0 | Lignin | 0.25 | 0.3 | 100 | 100 |
| E26 | 4.17 | PPG | 30 | Lignin | 0.25 | 0.3 | 76 | 100 |
| E3 | | | 80 | | | | 74 | 99 |
| E27 | | | 160 | | | | 71 | 99 |
| E28 | | | 320 | | | | 68 | 99 |
| E29 | | | 420 | | | | 66 | 78 |
| E30 | 4.17 | PEG | 80 | Lignin | 0.25 | 0.3 | 65 | 100 |
| E13 | | oleic | 190 | | | | 62 | 102 |
| E18 | | acid | 350 | | | | 59 | 100 |
| E31 | | | 420 | | | | 58 | 85 |

PPG: Polypropylene glycol
PEG oleic adic: Polyethylene glycol oleic acid ester

As shown in Table 3, the self discharge reducing effect is obtained even when the content of the polymer compound is very small. From the viewpoint of obtaining a higher effect of suppressing self discharge, the content of the polymer compound in the negative electrode material is preferably 10 ppm or more, more preferably 20 ppm or more or 30 ppm or more on a mass basis. From the viewpoint of securing higher low-temperature HR discharge performance, the content of the polymer compound in the negative electrode material is preferably 370 ppm or less, more preferably 350 ppm or less on a mass basis.

TABLE 4

| Battery No. | Positive electrode material density (g/cm³) | Polymer compound Type | Polymer compound Content (mass ppm) | Organic expander Type | Organic expander Content (mass %) | Carbonaceous material Content (mass %) | Self discharge (%) | Self discharge improvement rate (%) |
|---|---|---|---|---|---|---|---|---|
| C1 | 3.66 | — | 0 | Lignin | 0.25 | 0.3 | 100 | 0 |
| C4 | 4.17 | | | | | | 90 | 10 |
| R1 | 3.66 | PPG | 80 | Lignin | 0.25 | 0.3 | 90 | 10 |
| E3 | 4.17 | | | | | | 74 | 26 |
| C7 | 3.66 | — | 0 | Condensate of bisphenol | 0.15 | 0.3 | 106 | −6 |
| C8 | 4.17 | | | | | | 96 | 4 |
| R6 | 3.66 | PPG | 80 | Condensate of bisphenol | 0.15 | 0.3 | 93 | 7 |
| E32 | 4.17 | | | | | | 76 | 24 |

PPG: Polypropylene glycol

As shown in Table 4, when a condensate of a bisarene compound is used as the organic expander, self discharge tends to increase as compared with the case of using a lignin compound (comparison between C1 and C7). Also in the case of using the condensate of the bisarene compound, similarly to the case of using the lignin compound, even if the density of the positive electrode material is adjusted to a specific range, when the negative electrode material does not contain a polymer compound, the self discharge reducing effect is small (comparison between C7 and C8). Even when the negative electrode material contains the polymer compound, the self discharge reducing effect is small when the density of the positive electrode material is low (comparison between C7 and R6). However, when the density of the positive electrode material is adjusted to a specific range and the negative electrode material contains the polymer compound, the self discharge can be greatly reduced even when the condensate of the bisarene compound is used (comparison between R6 and E32). From the viewpoint of further reducing the self discharge, it is preferable to use the lignin compound.

TABLE 5

| Battery No. | Positive electrode material density (g/cm³) | Polymer compound Type | Polymer compound Content (mass ppm) | Organic expander Type | Organic expander Content (mass %) | Carbonaceous material Content (mass %) | Self discharge (%) | Self discharge improvement rate (%) |
|---|---|---|---|---|---|---|---|---|
| C1 | 3.66 | — | 0 | Lignin | 0.25 | 0.3 | 100 | 0 |
| C4 | 4.17 | | | | | | 90 | 10 |
| R1 | 3.66 | PPG | 80 | Lignin | 0.25 | 0.3 | 90 | 10 |
| E3 | 4.17 | | | | | | 74 | 26 |
| C9 | 3.66 | — | 0 | Lignin | 0.40 | 1.0 | 103 | −3 |
| C10 | 4.17 | | | | | | 91 | 9 |
| R7 | 3.66 | PPG | 400 | Lignin | 0.40 | 1.0 | 90 | 10 |
| E33 | 4.17 | | | | | | 68 | 32 |
| C7 | 3.66 | — | 0 | Condensate of bisphenol | 0.15 | 0.3 | 106 | −6 |
| C8 | 4.17 | | | | | | 96 | 4 |
| R6 | 3.66 | PPG | 80 | Condensate of bisphenol | 0.15 | 0.3 | 93 | 7 |
| E32 | 4.17 | | | | | | 76 | 24 |
| C11 | 3.66 | — | 0 | Condensate of bisphenol | 0.20 | 1.0 | 110 | −10 |
| C12 | 4.17 | | | | | | 98 | 2 |
| R8 | 3.66 | PPG | 400 | Condensate of bisphenol | 0.20 | 1.0 | 95 | 5 |
| E34 | 4.17 | | | | | | 71 | 29 |

PPG: Polypropylene glycol

As shown in Table 5, as the content of the carbonaceous material in the negative electrode material increases, self discharge tends to increase (comparison between C1 and C9 and comparison between C7 and C11). Even when the content of the carbonaceous material in the negative electrode material is large, the self discharge reducing effect is relatively small even when the density of the positive electrode material is increased to 4.17 g/cm³ (comparison of C1 and C4 with C9 and C10, comparison of C7 and C8 with C11 and C12). Even when the negative electrode material contains the polymer compound, if the density of the positive electrode material is low, the self discharge reducing effect is relatively small (comparison of C1 and R1 with C9 and R7, comparison of C7 and R6 with C11 and R8). On the other hand, by adjusting the density of the positive electrode material to a specific range while the negative electrode material contains the polymer compound, the self discharge can be greatly reduced even when the content of the carbonaceous material in the negative electrode material is large (E33 and E34).

INDUSTRIAL APPLICABILITY

The valve regulated lead-acid battery is suitable for small mobility, idle reduction vehicle applications, industrial batteries, and the like. Note that these applications are merely illustrative and not limited to these applications.

DESCRIPTION OF REFERENCE SIGNS

1: valve regulated lead-acid battery
2: negative electrode plate
3: positive electrode plate
4: separator
11: element
10: container
10R: cell chamber
12: Lid
13: exhaust valve

The invention claimed is:

1. A valve regulated lead-acid battery comprising at least one cell including an element and an electrolyte solution,
   wherein the element includes a negative electrode plate, a positive electrode plate, and a separator interposed between the negative electrode plate and the positive electrode plate,
   the negative electrode plate includes a negative electrode material,
   the negative electrode material contains a polymer compound having a peak in a range of 3.2 ppm or more and 3.8 ppm or less in a chemical shift of a ¹H-NMR spectrum measured using deuterated chloroform as a solvent,
   the positive electrode plate includes a positive electrode material, and
   a density of the positive electrode material is 3.70 g/cm³ or more and 4.65 g/cm³ or less.

2. The lead-acid battery according to claim 1, wherein the polymer compound contains an oxygen atom bonded to a terminal group and a —CH₂— group and/or a —CH< group bonded to the oxygen atom, and
   in the ¹H-NMR spectrum, a ratio of an integrated value of the peak to a sum of the integrated value of the peak, an integrated value of a peak of a hydrogen atom of the —CH₂— group, and an integrated value of a peak of a hydrogen atom of the —CH< group is 85% or more.

3. The lead-acid battery according to claim 1, wherein the polymer compound has a repeating structure of oxy $C_{2\text{-}4}$ alkylene units.

4. The lead-acid battery according to claim 1, wherein the density of the positive electrode material is 3.74 g/cm³ or more and 4.40 g/cm³ or less.

5. The lead-acid battery according to claim 1, wherein a content of the polymer compound in the negative electrode material is 10 ppm or more on a mass basis.

6. The lead-acid battery according to claim 1, wherein a content of the polymer compound in the negative electrode material is 370 ppm or less on a mass basis.

7. The lead-acid battery according to claim 1, wherein the polymer compound contains at least one selected from a group consisting of a hydroxy compound having the repeating structure of oxy $C_{2\text{-}4}$ alkylene units, an etherified product of the hydroxy compound and an esterified product of the hydroxy compound, and
   the hydroxy compound is at least one selected from a group consisting of a poly $C_{2\text{-}4}$ alkylene glycol, a copolymer having the repeating structure of oxy $C_{2\text{-}4}$ alkylene, and a poly $C_{2\text{-}4}$ alkylene oxide adduct of a polyol.

8. The lead-acid battery according to claim 1, wherein the polymer compound has a repeating structure of oxypropylene units.

9. The lead-acid battery according to claim 7, wherein the polymer compound has one or more hydrophobic groups, and
   at least one of the hydrophobic groups is a long-chain aliphatic hydrocarbon group having 8 or more carbon atoms.

10. The lead-acid battery according to claim 7, wherein the polymer compound has a repeating structure of oxyethylene units.

11. The lead-acid battery according to claim 1, which is used for small mobility.

12. The lead-acid battery according to claim 1, wherein the negative electrode material contains a lignin compound.

13. The lead-acid battery according to claim 1, wherein the negative electrode material contains a condensate of a bisarene compound.

14. The lead-acid battery according to claim 1, wherein the negative electrode material contains a carbonaceous material, and
   a content of the carbonaceous material in the negative electrode material is 0.1% by mass or more and 1.2% by mass or less.

15. A valve regulated lead-acid battery comprising at least one cell including an element and an electrolyte solution,
   wherein the element includes a negative electrode plate, a positive electrode plate, and a separator interposed between the negative electrode plate and the positive electrode plate,
   the negative electrode plate includes a negative electrode material,
   the negative electrode material contains a polymer compound having a repeating structure of oxy $C_{2\text{-}4}$ alkylene units,
   the positive electrode plate includes a positive electrode material, and
   a density of the positive electrode material is 3.70 g/cm³ or more and 4.65 g/cm³ or less.

* * * * *